(12) United States Patent
Wietfeldt et al.

(10) Patent No.: US 11,119,790 B2
(45) Date of Patent: Sep. 14, 2021

(54) LOW LATENCY CLOCK-BASED CONTROL VIA SERIAL BUS

(71) Applicant: QUALCOMM Incorporated, San Diego, CA (US)

(72) Inventors: Richard Dominic Wietfeldt, San Diego, CA (US); Lalan Jee Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/507,947

(22) Filed: Jul. 10, 2019

(65) Prior Publication Data

US 2020/0034158 A1    Jan. 30, 2020

Related U.S. Application Data

(60) Provisional application No. 62/703,117, filed on Jul. 25, 2018.

(51) Int. Cl.
*G06F 9/445* (2018.01)
*G06F 1/10* (2006.01)
*G06F 13/42* (2006.01)

(52) U.S. Cl.
CPC ............ *G06F 9/44505* (2013.01); *G06F 1/10* (2013.01); *G06F 13/4291* (2013.01)

(58) Field of Classification Search
CPC ..... G06F 9/44505; G06F 1/10; G06F 13/4291
See application file for complete search history.

(56) References Cited

U.S. PATENT DOCUMENTS

| | | | |
|---|---|---|---|
| 5,925,135 A | * | 7/1999 | Trieu .................... G06F 1/12 713/400 |
| 2018/0150424 A1 | * | 5/2018 | Miluzzi ................ G06F 13/404 |
| 2018/0365188 A1 | * | 12/2018 | Srivastava .......... G06F 13/4045 |
| 2019/0004991 A1 | * | 1/2019 | Foust .................. G06F 13/4291 |
| 2019/0179644 A1 | * | 6/2019 | Li ........................ G06F 13/1689 |

* cited by examiner

*Primary Examiner* — Glenn A. Auve
(74) *Attorney, Agent, or Firm* — Qualcomm Incorporated

(57) ABSTRACT

Systems, methods, and apparatus for improving bus latency for trigger activation are described. One method includes using configuration information received from a serial bus and stored in a holding register to reconfigure a peripheral device in accordance with timing indicated by at least one edge in clock pulses transmitted on a clock line of the serial bus. A trigger is activated by detection of a first edge in the clock pulses. Bits of the holding register are transferred to a register that controls elements of the peripheral device when the trigger is actuated. The trigger may be activated as indicated by trigger activation information received in a datagram. The trigger may be activated as indicated by a start condition transmitted on the serial bus. The trigger may be enabled or disabled based on signaling state of a data line of the serial bus when the first edge is detected.

21 Claims, 22 Drawing Sheets

Transaction-Based Trigger Actuation

| Field (802) → | SSC | Slave Address | Command Code | P | Trigger Activation Byte | P | BP |
|---|---|---|---|---|---|---|---|
| Clock Cycles (804) → | 2 | 4 | 8 | 1 | 8 | 1 | 1 |

*FIG. 8*

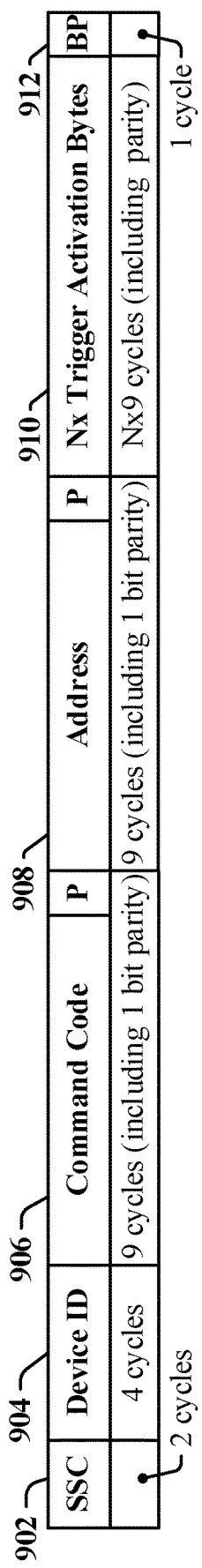
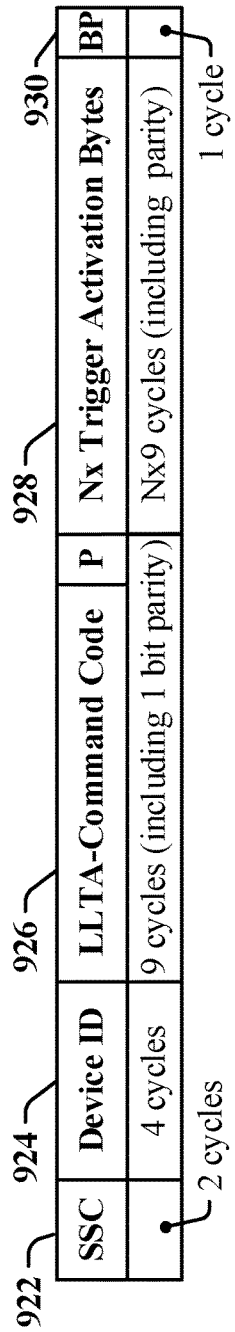
FIG. 9

Legacy Trigger Activation Transmission

| SSC | Device ID | Command Code | P | Address | P | Nx Trigger Activation Bytes | BP |
|---|---|---|---|---|---|---|---|
| 2 cycles | 4 cycles | 9 cycles (including 1 bit parity) | 9 cycles (including 1 bit parity) | | | Nx9 cycles (including parity) | 1 cycle |

1002, 1004, 1006, 1008, 1010, 1012

Total Clock Cycles = 25 + (N x 9)

1000

Second Low-Latency Trigger Activation Transmission

| SSC | Magic-ID | Nx Trigger Activation Bytes | BP |
|---|---|---|---|
| 2 cycles | 4 cycles | Nx9 cycles (including parity) | 1 cycle |

1022, 1024, 1026, 1028

Total Clock Cycles = 7 + (N x 9)

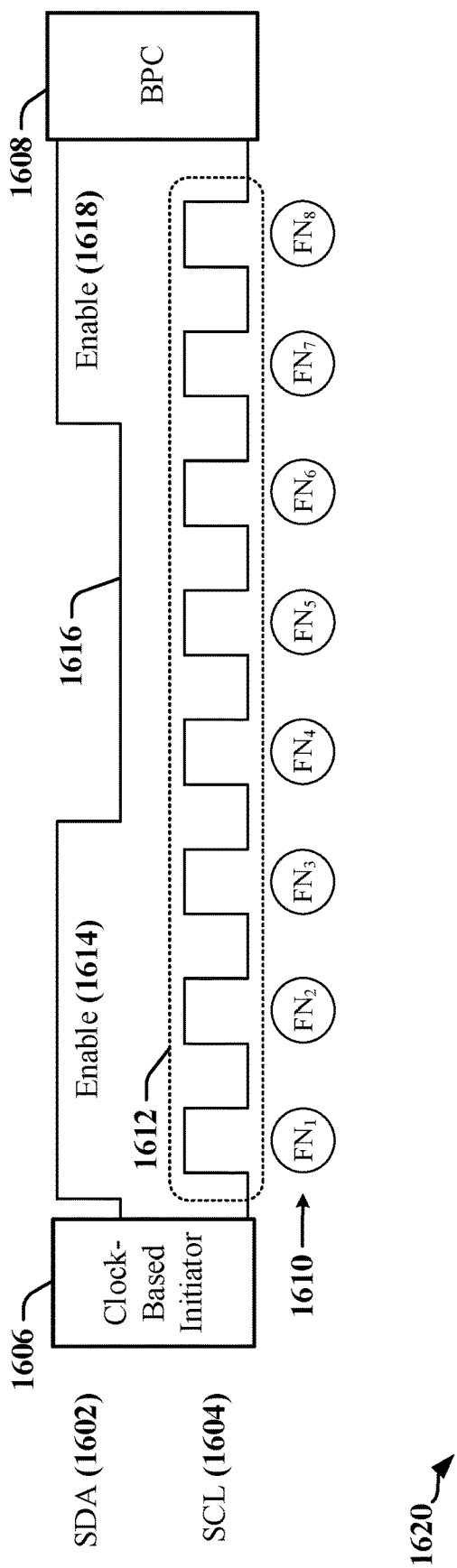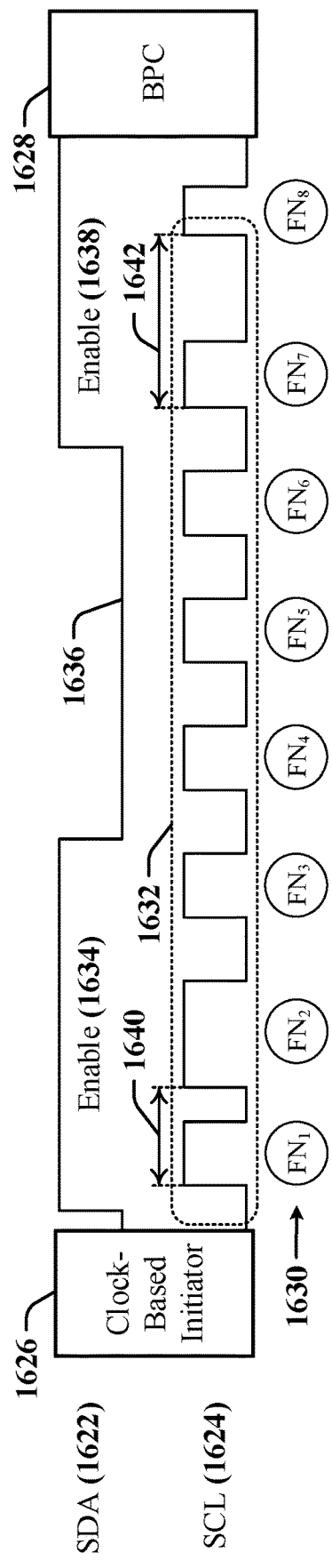
FIG. 16

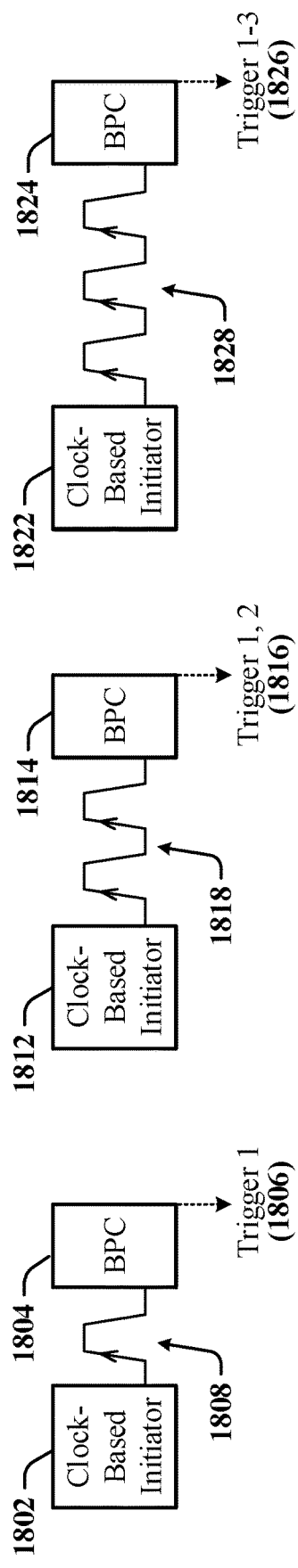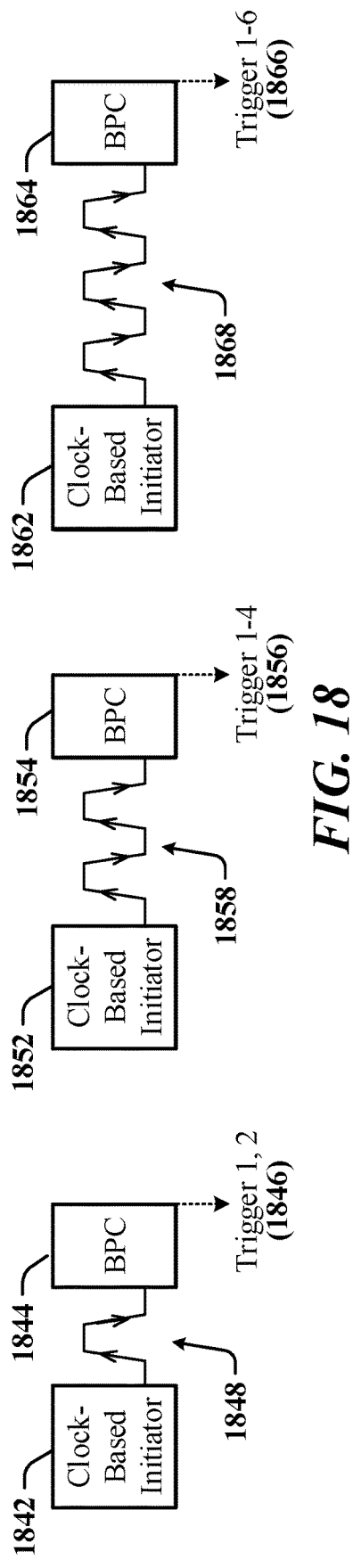
FIG. 18

LOW LATENCY CLOCK-BASED CONTROL VIA SERIAL BUS

PRIORITY CLAIM

This application claims priority to and the benefit of U.S. Provisional Patent Application Ser. No. 62/703,117 filed in the U.S. Patent Office on Jul. 25, 2018, the entire content of this application being incorporated herein by reference as if fully set forth below in its entirety and for all applicable purposes.

TECHNICAL FIELD

The present disclosure relates generally to serial communication over a shared serial bus and, more particularly, to optimizing latencies associated with time-critical data transmitted over the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the system power management interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. The RFFE interface defines a communication interface that can be used for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links. The SPMI provides a hardware interface that may be implemented between baseband or application processors and peripheral components. In some instances, the SPMI is deployed to support power management operations within a device.

A multi-drop serial bus may be implemented using one or more interface protocols to support high-priority, low-latency communication between an application processor and certain peripherals, and other lower-priority communication. Latency can be adversely affected when multiple devices coupled to the serial bus are concurrently active. Degraded latencies can lead to an increase in dropped packets, session timeouts and retransmissions on the serial bus. As mobile communication devices continue to include a greater level of functionality, improved serial communication techniques are needed to improve latencies and/or improve handling of priority traffic on a serial bus that couples peripherals and application processors.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a device coupled to a serial bus includes receiving configuration information transmitted over a serial bus, receiving one or more clock pulses on a clock line of the serial bus, and using the configuration information to reconfigure at least one device and in accordance with timing indicated by at least one edge of the one or more clock pulses.

In certain aspects, the method includes storing the configuration information in a first holding register associated with a first trigger, actuating the first trigger after detecting a first edge in the one or more clock pulses, and transferring one or more bits of the first holding register to a register that controls one or more elements of the at least one device when the first trigger is actuated. Trigger activation information may be received in a datagram that includes at least a portion of the configuration information. The first trigger may be activated when indicated by the trigger activation information. The first trigger may be actuated when a data line of the serial bus is in a first signaling state when the first edge is detected. A second trigger may be suppressed when the data line is in a second signaling state when the first edge is detected. A trigger identifier may be received in the datagram after the trigger activation information. The trigger identifier may indicate the first trigger.

The method may include receiving trigger activation information in a datagram that includes at least a portion of the configuration information, and actuating the first trigger as a bit of the configuration information is received when the bit activates the first trigger.

The method may include receiving trigger activation information in a datagram that includes at least a portion of the configuration information. The one or more clock pulses may be received after the trigger activation information.

The method may receive one or more clock pulses by receiving a sequence start condition, and receiving the one or more clock pulses upon completion of the sequence start condition. The first trigger may be actuated when a data line of the serial bus is in a first signaling state when the first edge is detected. The second trigger may be suppressed when the data line is in a second signaling state when the first edge is detected.

The method may include actuating a second trigger after detecting a second edge in the one or more clock pulses, and transferring one or more bits of a second holding register to a second register that controls an element of the at least one device when the second trigger is actuated. A time elapsed between the first edge and the second edge may include a stretched clock period. The first edge may correspond to a signaling transition in a first direction, and the second edge may correspond to a signaling transition in a second direction that is different from the first direction.

In various aspects of the disclosure, an apparatus has an interface circuit adapted to couple the apparatus to a first serial bus and a processor. The processor may be configured to receive configuration information transmitted over a serial bus, receive one or more clock pulses on a clock line of the serial bus, and use the configuration information to reconfigure at least one device and in accordance with timing indicated by at least one edge of the one or more clock pulses. The processor may be further configured to store the configuration information in a first holding register associated with a first trigger, actuate the first trigger after detecting a first edge in the one or more clock pulses, and transfer one or more bits of the first holding register to a register that controls one or more elements of the at least one device when the first trigger is actuated.

In various aspects of the disclosure, a processor-readable storage medium includes code for receiving configuration information transmitted over a serial bus, receiving one or more clock pulses on a clock line of the serial bus, and using the configuration information to reconfigure at least one device and in accordance with timing indicated by at least one edge of the one or more clock pulses.

In various aspects of the disclosure, an apparatus includes means for receiving configuration information transmitted over a serial bus, means for receiving one or more clock pulses on a clock line of the serial bus, and means for using the configuration information to reconfigure at least one device and in accordance with timing indicated by at least one edge of the one or more clock pulses.

BRIEF DESCRIPTION OF THE DRAWINGS

FIG. 8 illustrates a transaction activation datagram that may initiate a trigger used to transfer information into one or more trigger elements in accordance with certain aspects disclosed herein.

FIG. 9 illustrates a first low-latency datagram structure that may be used to carry a low-latency Trigger-Activation command in accordance with certain aspects disclosed herein.

FIG. 10 illustrates a second low-latency datagram structure that may be used to carry a low-latency Trigger-Activation command in accordance with certain aspects disclosed herein.

FIG. 16 illustrates transmissions that can be used to mask selected trigger actuations in accordance with certain aspects disclosed herein.

FIG. 18 illustrates certain clock signal configurations that can optimize latency when clock based triggering is implemented, including the various implementations illustrated in FIGS. 12-17 and in accordance with certain aspects disclosed herein.

DETAILED DESCRIPTION

Figure 1:
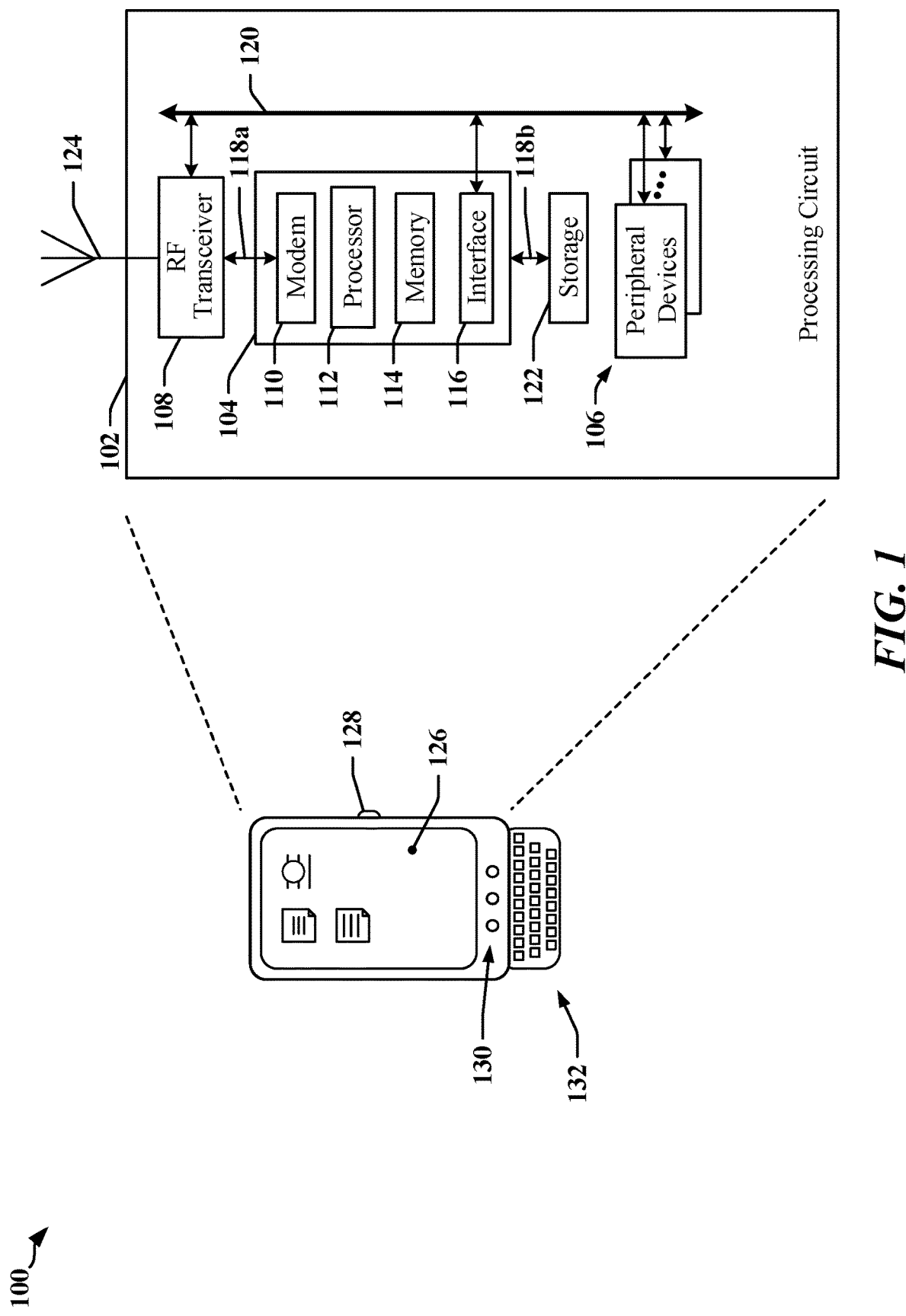
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or another protocol that may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration and/or command transmissions specified by protocol.

High bus latency can limit the capabilities and functionality of a serial bus in certain applications. For example, bus latency considerations may limit the number of radio frequency (RF) devices that can be coupled by an I3C, RFFE or SPMI bus. In some examples, multiple serial buses may be implemented to enable RF or other low-latency devices to communicate within tight time constraints, including where bus throughput, utilization and/or other operating characteristics are otherwise easily supported by a single bus.

Certain operations performed using a radio frequency IC require very low-latency communication between devices. For example, configuration and reconfiguration of circuits used to drive multiple antennas may generate large volumes of messages, commands and signaling directed to multiple radio frequency components. In many instances, the messages may include configuration parameters that are to be applied at a time determined by a controlling device. In some instances, triggers may be sent to activate a configuration. Triggers sent to initiate a sequence of configurations or actions according to timeline in a radio frequency device must typically be communicated with very low latency.

Certain aspects disclosed herein reduce the clock-cycle overhead associated with the transmission of trigger activation information. In one example, clock-cycle overhead includes the clock cycles used to transmit the fields of an RFFE datagram that do not carry payload data. Clock-cycle overhead may be reduced through the use of clock-based trigger actuation.

Configuration information received from a serial bus may be used to reconfigure at least one peripheral device in accordance with timing indicated by at least one edge in clock pulses transmitted on the serial bus. The term edge may be used herein to refer to transitions between signaling states in a signal. In the example of a clock signal, each pulse is defined by a positive transition (pos-edge) and a corresponding negative transition (neg-edge), where a positive transition occurs when a digital signal transitions from a low-voltage state to a higher-voltage state, and a negative transition occurs when the digital signal transitions from the higher-voltage state to the low-voltage state.

Configuration information may be initially stored in a first holding register associated with a trigger, where the trigger is activated after detecting a first edge in the clock pulses. One or more bits of the first holding register may be transferred to a register that controls one or more elements of the at least one peripheral device when the trigger is actuated. Trigger activation information may be received in a datagram. The trigger may be activated when indicated by the trigger activation information. The trigger may be activated after a modified or augmented sequence start condition is received. The trigger may be actuated when a data line of the serial bus is in a first signaling state when the first edge is detected. The trigger may be may be suppressed when the data line is in a second signaling state when the first edge is detected.

Certain aspects disclosed herein may be applicable to a serial bus operated in accordance with an I2C, I3C, SPMI, and/or RFFE protocol, or other protocol. Certain aspects are applicable to a serial bus operated in either half-duplex mode or full-duplex mode. Certain aspects are applicable to point-to-point interfaces, including Universal Asynchronous Receiver/Transmitter (UART) interfaces, line multiplexed UART (LM-UART) interfaces, and/or virtual GPIO (VGI) and messaging interfaces. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
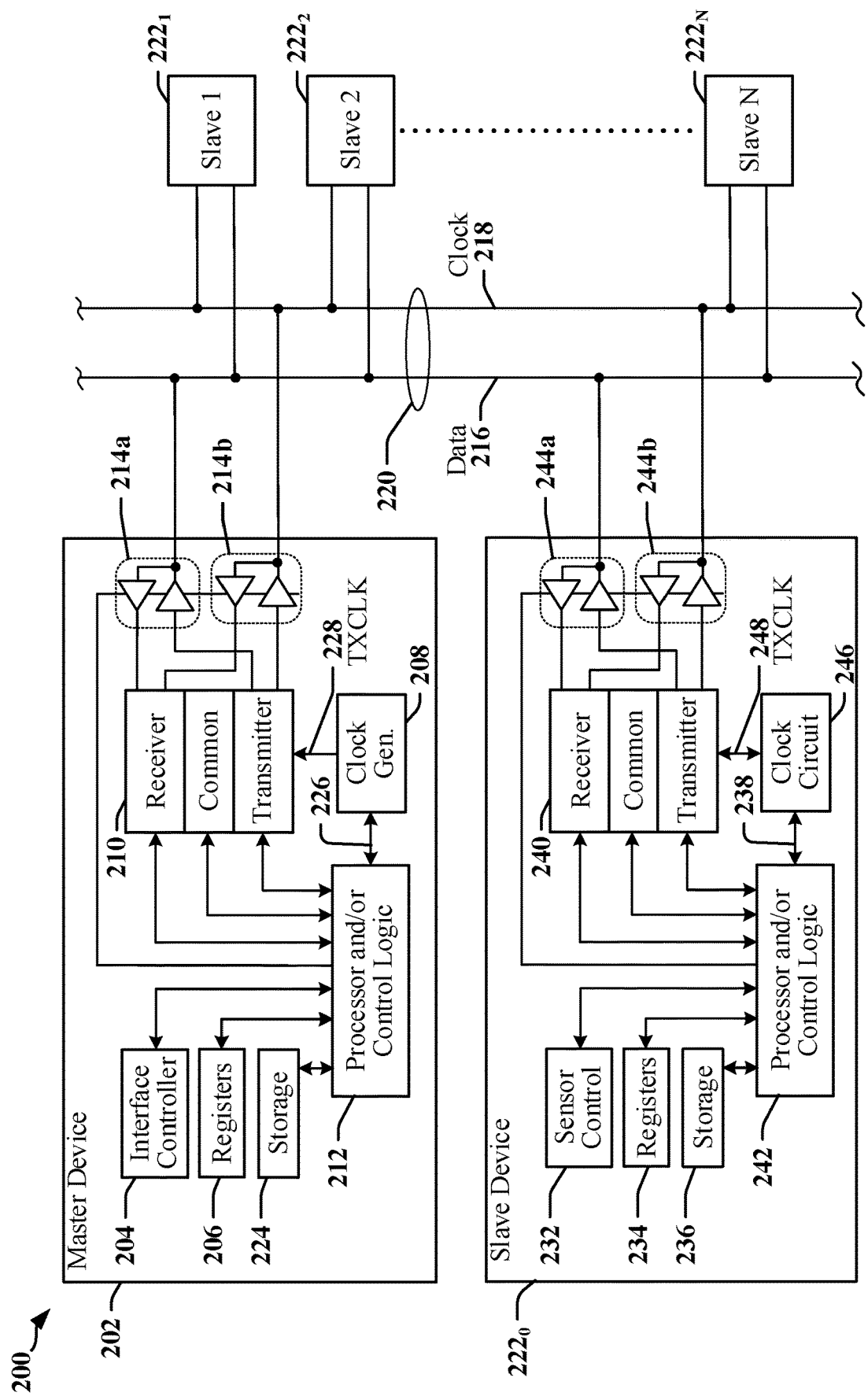
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with I2C, I3C, RFFE, SPMI, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
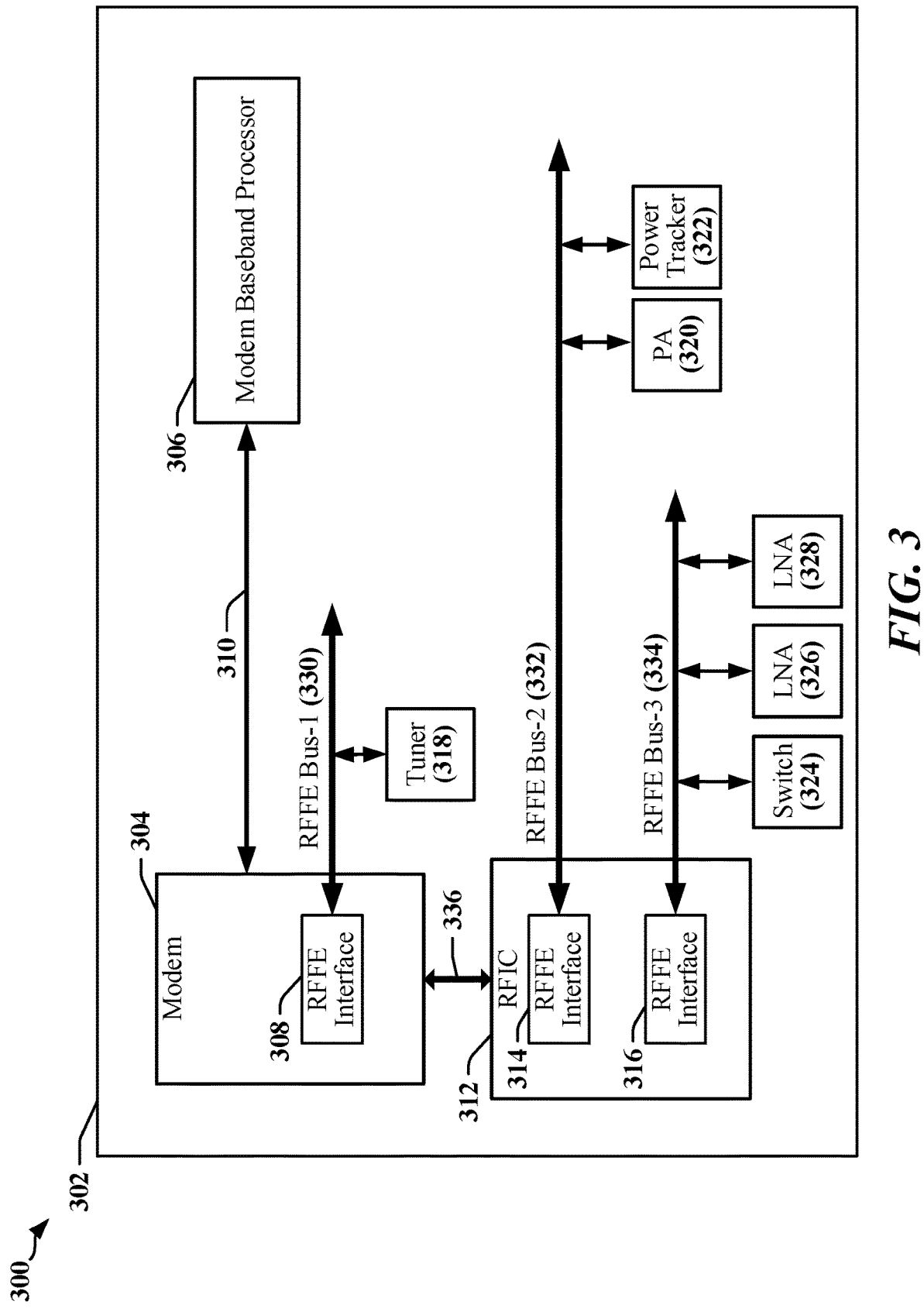
FIG. 3 illustrates a device configuration for coupling various radio frequency front-end devices using multiple RFFE buses.

FIG. 3 is a diagram 300 illustrating an example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and a Radio-Frequency IC (RFIC 312) through respective communication links 310, 336 or, in some implementations, through a common communication link 310 or 336. The illustrated device 302 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the modem 304 is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. In the illustrated example, the RFIC 312 communicates with a PA 320 and a power tracking module 322 through a first of its RFFE interfaces 314 and the second RFFE bus 332. In the illustrated example, RFIC 312 communicates with a switch 324 and one or more LNAs 326, 328 through a second of its RFFE interfaces 316 and the third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, delays associated with interrupt processing, the time required to terminate transmission of a datagram already in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more devices. Devices that can interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Multi-drop interfaces such as RFFE, SPMI, I3C, etc. can reduce the number of physical input/output (I/O) pins used to communicate between multiple devices. In the example illustrated in FIG. 3, two physical I/O pins are consumed on the RFIC 312 to support communication with three devices 324, 326, 328 over the third RFFE bus 334, whereas six or more physical I/O pins would be consumed if the RFIC 312 used point-to-point UART-based links to communicate with the three devices 324, 326, 328. Protocols that support communication over a multi-drop serial bus define datagram structures used to transmit command, control and data payloads. Datagram structures for different protocols define certain common features, including addressing used to select devices to receive or transmit data, clock generation and management, interrupt processing and device priorities. In this disclosure, the example of RFFE and SPMI protocols may be employed to illustrate certain aspects disclosed herein. However, the concepts disclosed herein are applicable to other serial bus protocols and standards. Some similarities exist between RFFE and SPMI datagram structures.

Figure 4:
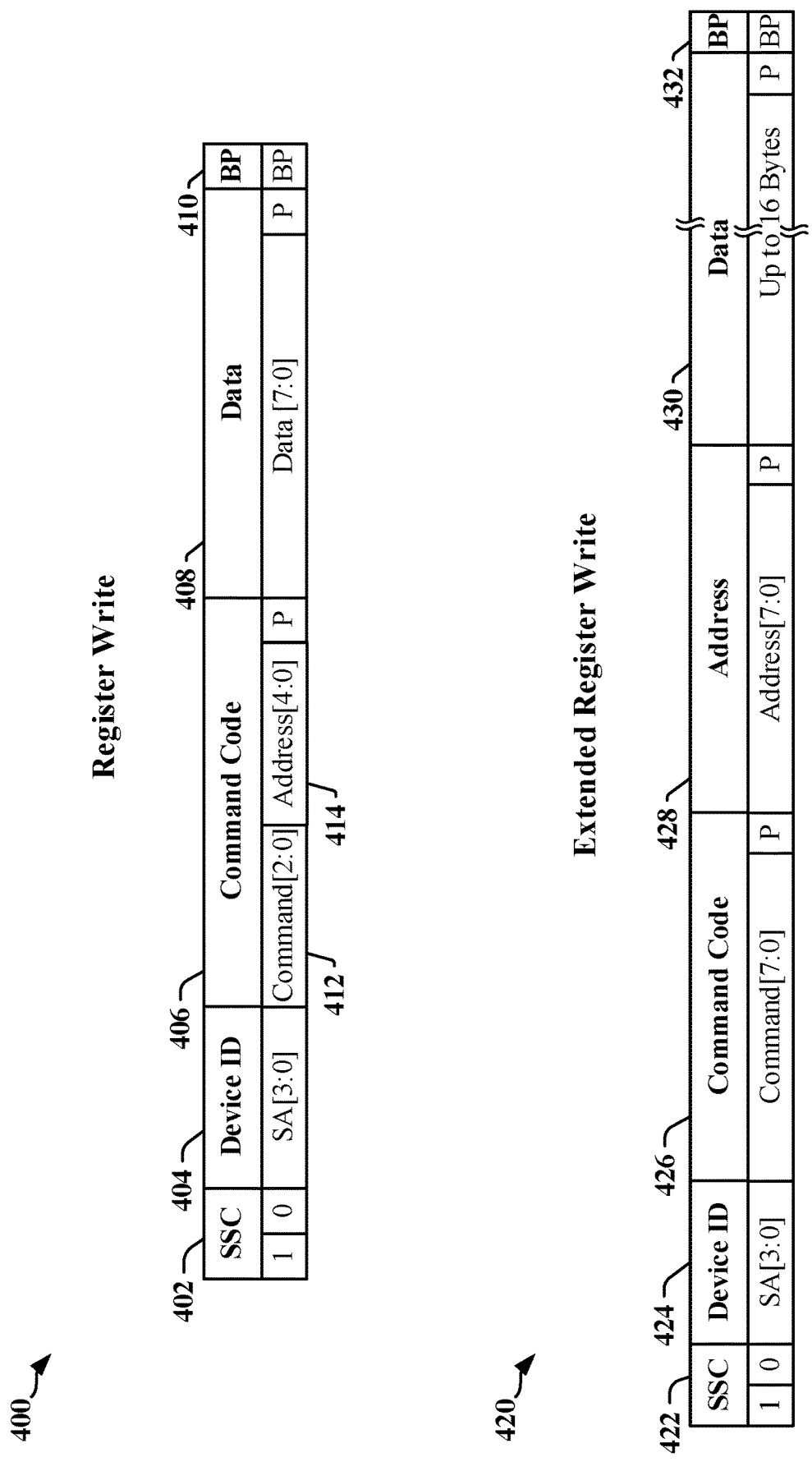
FIG. 4 illustrates datagram structures defined by RFFE protocols.

FIG. 4 illustrates datagram structures 400, 420 for a Register Write command and an Extended Register Write command. The datagram structures 400, 420 are defined by RFFE protocols, and can be used to efficiently write data to registers within the addressable register address range of a slave device. The datagram structures 400, 420 commence with transmission of a two-bit sequence start condition (SSC 402, 422) followed by a four-bit device ID 404, 424. A nine-bit command field 406, 426 is transmitted next. In the Register Write command datagram structure 400, the nine-bit command field 406 includes a three-bit command code 412, a five-bit address field 414 and a parity bit. In the Extended Register Write command data structure 420, the nine-bit command field 406 is occupied by an eight-bit command code and a parity bit and followed by an address field 428 that carries an eight-bit register address and a parity bit. In the Register Write command datagram structure 400, a data field 408 carries a single data byte, while in the Extended Register Write command datagram structure 420, the data field 430 carries up to 16 data bytes. Each data byte is transmitted with a parity bit. Bus park signaling 410, 432 terminates the datagram structures 400, 420.

Triggers Transmitted Over a Multidrop Bus

Triggers provide an essential mechanism for RF front-end control, and triggers may be used to coordinate activities of different front-end components. For example, triggers can be used for a variety of purposes including beam steering or beamforming, gain setting, antenna path multiplexer control, etc. Certain aspects of triggers are presented here in the context of beam steering applications, as illustrated in FIGS. 5 and 6.

Beam steering or beamforming may be obtained when a transmitting device applies amplitude and phase controls to data signals transmitted through multiple antennas in an array of antennas and/or where a receiving device applies amplitude and phase controls to data signals received from a number of antennas. Examples of antenna arrays include a one-dimensional linear array, a two-dimensional square array, a two-dimensional rectangular array and a two-dimensional circular array. At a given time, a directed beam can be formed in a particular direction or angle relative to the antenna array.

Figure 5:
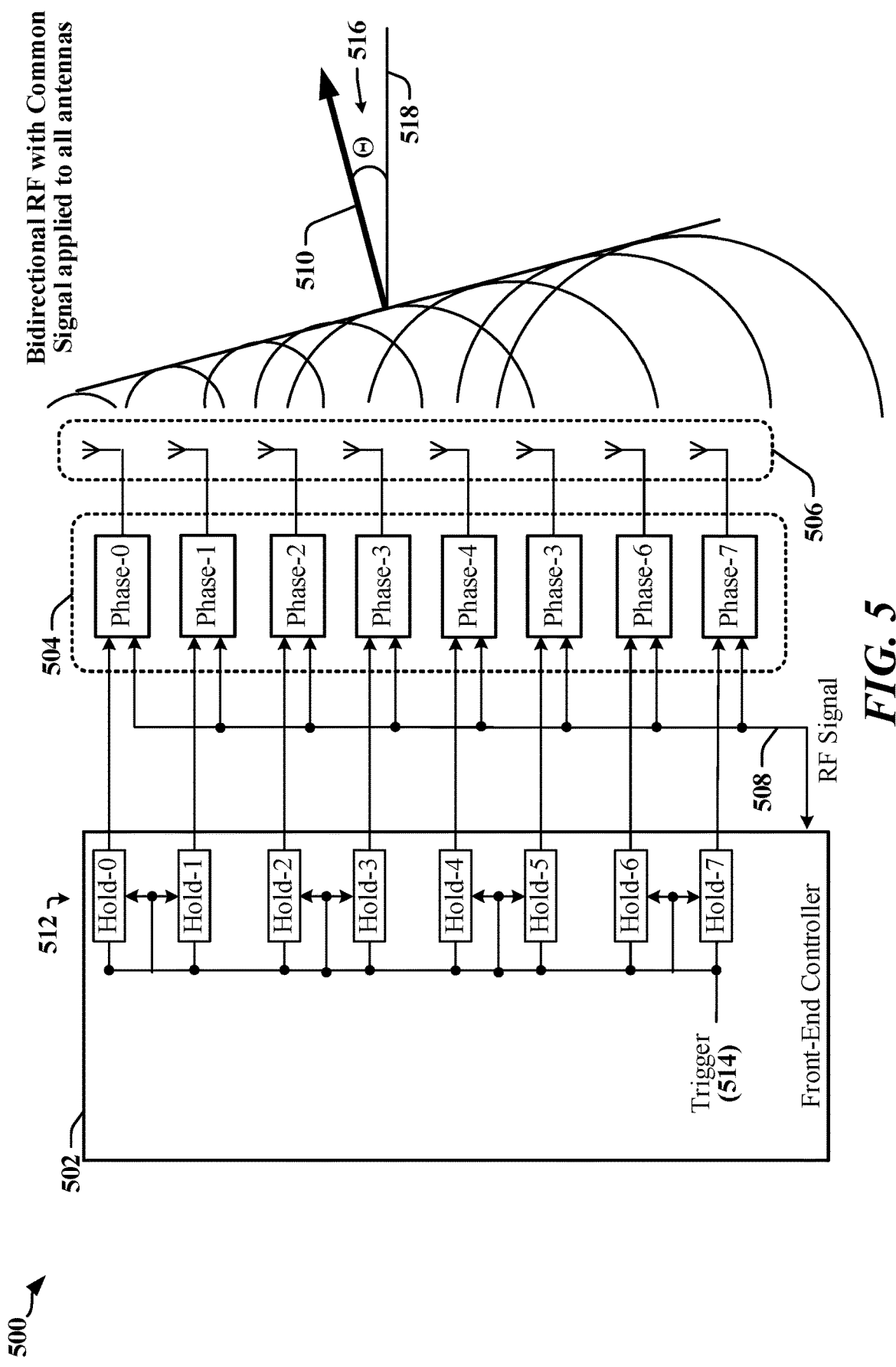
FIG. 5 illustrates a first example of a radio frequency front-end controller that employs triggers to configure and control the operation of an antenna array.
Figure 6:
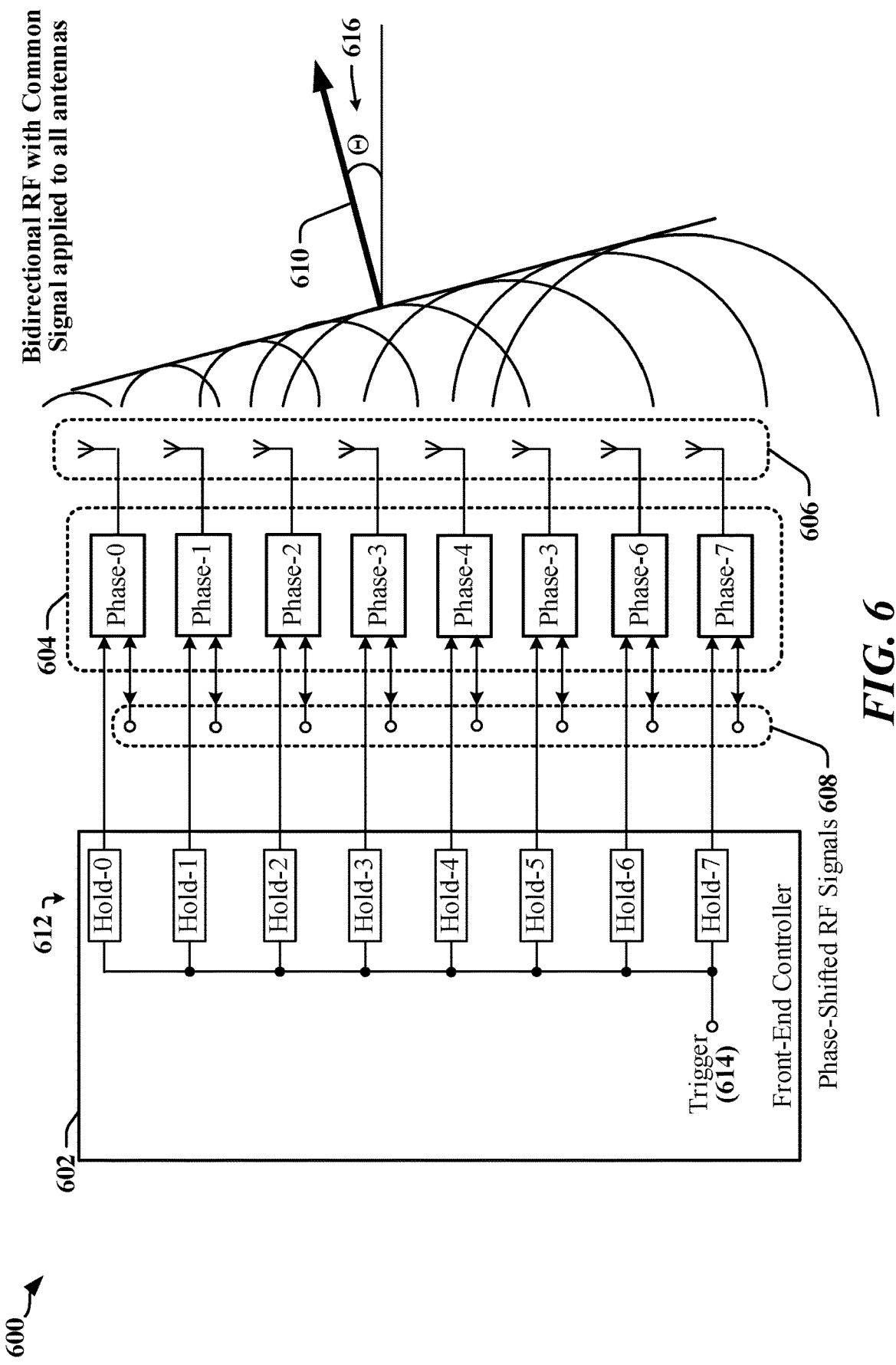
FIG. 6 illustrates a second example of a radio frequency front-end controller that employs triggers to configure and control the operation of an antenna array.

FIG. 5 illustrates a first example of a beam steering RF front-end 500. In an array of identical radiating antenna elements, five factors within an operational frequency range can be defined that control the beam shape in a given direction, including configuration, geometry, amplitude, phase and antenna pattern. Frequency determines the operating wavelength $\lambda$. The configuration factor may be defined as the geometrical configuration of the array, such as linear, rectangular, or circular. The geometry factor may be defined as the relative displacement between antenna elements in an antenna array 506, such as the physical distance between elements in a linear array. In some examples, the geometry factor may define a physical distance between two or more antenna elements as $\lambda/2$. The amplitude factor may be defined as the excitation amplitude of individual antenna elements in the antenna array 506. The amplitude factor may be expressed in relative terms such as equal or weighted amplitudes. The phase factor may be defined as the excitation phase of individual antenna elements. The phase factor may be expressed in relative terms such as equal or linearly increasing phase angles. The pattern factor may be defined as the radiation pattern of individual antenna elements, including an omnidirectional pattern for example. In some implementations, the configuration, geometry, pattern and frequency are fixed, with the amplitude and phase being adjustable. In some implementations a further simplification is adopted by fixing the amplitude for each antenna element in the antenna array 506, and leaving only the phase variable for each antenna element.

Beamforming may be referred to as spatial filtering to represent its directivity or beam pointedness in a given direction of space.

In Multi-User Multiple Input Multiple Out (MU-MIMO) beamforming, which can also be referred to as implicit beamforming, phase changes are inserted by an WiFi Access Point or 4G/5G Base Station into the data stream at baseband. Baseband signals are directed through various RF circuits to respective antenna elements in the antenna array 506. Phase-shifting circuits 504 may apply a universal phase-shift, no phase shift and/or calibration phase shifts based on design and/or context.

In self-steering beamforming, which is also known as explicit beamforming, phase changes are inserted by the transmitter to achieve a directed beam in a given direction toward a client receiver.

In some implementations, a hybrid of MU-MIMO and self-steering beamforming can be employed.

In the example illustrated in FIG. 5, the antenna elements include eight linear uniformly-spaced antennas forming the antenna array 506. The antenna array 506 can be directed to beamform to a selected propagation path 510 that lies at an angle 516 ($\Theta$) relative to the perpendicular 518 of the array elements. Given a desired value of $\Theta$, a processor in the RF front-end controller 502, a baseband controller, or other device may generate the phase offsets for each antenna relative to a given reference phase $\Phi$. In some cases, $\Phi$ can be set to zero. The beam direction equation for the phase offset, $\Delta\Phi(\Theta)$, for each antenna element may be given by the following:

$$\Delta\Phi(\Theta)=360°\times d\times \sin(\Theta)/\lambda.$$

The phase offsets may be applied to baseband signals directed to the antenna elements or to a common RF signal provided to all of the antenna elements.

In the beam steering example illustrated in FIG. 5, phase-shifting circuits 504 may apply different phase shifts to a common RF signal at the antenna array 506. The beam steering RF front-end 500 may be adapted to use triggers to configure and control the operation of the phase-shifting circuits 504 and the antenna array 506. The phase-shifting circuits 504 and antenna array 506 may be collocated in the same device IC or package, or may be packaged separately. In various implementations, the RF front-end controller 502 may receive commands, configuration information and triggers from an RFIC, RF front-end controller 502, or other processing device. In the illustrated example, the RF front-end controller 502 may configure the antenna array 506 for beam steering. Beam steering can increase RF signal strength along a selected propagation path 510 or increase the sensitivity of the antenna array 506 to RF signals received from the selected propagation path 510.

When transmitting, each antenna in the antenna array 506 receives a phase-shifted version of an RF signal 508 for transmission. A set of phase-shifting circuits 504 provides the phase offset calculated for each antenna element in the antenna array 506 to the RF signal 508. One or more different phase offsets may be applied to the RF signal 508 for transmission by the antenna array 506. The phase-shifting circuits 504 can be configured to cause constructive interference along the selected propagation path 510, and destructive interference along other propagation paths.

When receiving an RF signal, the set of phase-shifting circuits 504 selectively applies a phase offset to the RF signal received at each antenna in the antenna array 506. Phase-shifted versions of the received RF signals are combined to provide the received RF signal 508. The set of phase-shifting circuits 504 applies the phase offset calculated for each signal received from the antenna array 506. The set of phase-shifting circuits 504 is configured to introduce constructive interference to signals received from the selected propagation path 510, and destructive interference to signals received from other propagation paths.

The RF front-end controller 502 may receive configuration information to be provided to the set of phase-shifting circuits 504 when a change in beam direction (selected propagation path 510) is desired or required. The configuration information may include phase offset, amplitude and other parameters that may be stored in respective elements of holding registers 512. In some instances, the holding registers 512 may be written directly by a processor in the RF front-end controller 502 that generates the phase offsets for each antenna. In some implementations, the holding registers 512 may be accessible through a serial bus and may be configured by an external processor, baseband controller, or other device that can generate the phase offsets for each antenna. In one aspect, antenna control parameters may be expressed as, or viewed as complex numbers including amplitude and phase values, where the holding registers 512 can store amplitude values and phase offset values. Different sets of registers may be provided and configured when both amplitude and phase offset information is generated to control the antenna array 506.

In one example, the RF front-end controller 502 stores phase offset values for the set of phase-shifting circuits 504 in all or a set of the holding registers 512. Each of the holding registers 512 may hold a phase offset that can be used to configure a corresponding phase-shifting circuit. A trigger signal 514 causes the phase offsets stored in holding registers 512 to be transferred to corresponding phase-shifting circuits 504. In conventional systems, the trigger signal 514 is fired in response to a message received from an RFFE bus. The RFFE bus may also be used to write the configuration information into the holding registers 512.

FIG. 6 illustrates a second example of a beam steering RF front-end 600. In this example, multiple phase-shifted RF signals 608 are generated by applying phase offsets to a base RF signal. The phase-shifted RF signals 608 are directed to the antenna array 606. Phase-shifting circuits 604 may apply further phase offsets and/or amplitude adjustments to the phase-shifted RF signals 608. The phase-shifting circuits 604 and antenna array 606 may be collocated in the same device IC or package, or may be packaged separately. The beam steering RF front-end 600 may be adapted to use triggers to configure and control the operation of the phase-shifting circuits 604 and the antenna array 606. In various implementations, the RF front-end controller 602 may generate or receive commands, configuration information and triggers from an RFIC, RF front-end controller 602, or other processing device. In the illustrated example, the RF front-end controller 602 may configure the antenna array 606 for beam steering. Beam steering can increase RF signal strength along a selected propagation path 610 or increase the sensitivity of the antenna array 606 to RF signals received from the selected propagation path 610.

When transmitting, each antenna in the antenna array 606 receives one of the phase-shifted RF signals 608 for transmission. One or more additional different phase offsets may be applied to the phase-shifted RF signals 608. The phase offsets in the phase-shifted RF signals 608 may be calculated to cause constructive interference along the selected propagation path 610, and destructive interference along other propagation paths.

When receiving, the set of phase-shifting circuits 604 may selectively apply phase offsets to RF signals received at each antenna in the antenna array 606. These phase-shifted RF signals 608 may be provided to an RFIC, RF front-end controller 602, or other processing device.

The RF front-end controller 602 may receive configuration information that is to be provided to the set of phase-shifting circuits 604. The configuration information may include phase offset, amplitude and other parameters that may be stored in respective elements of the holding registers 612. In one aspect, antenna control parameters may be represented as, or viewed as complex numbers including amplitude and phase values, where the holding registers 612 can store amplitude values and phase offset values. Different sets of registers may be provided and configured when both amplitude and phase offset information is generated to control the antenna array 606.

In one example, the RF front-end controller 602 stores phase offset values for the set of phase-shifting circuits 604 in a set of the holding registers 612, where each register holds a phase offset that can be used to configure a corresponding phase-shifting circuit. A trigger signal 614 causes the phase offsets stored in the set of holding registers 612 to be transferred to corresponding phase-shifting circuits 604. In conventional systems, the trigger signal 614 is fired in response to a message received from an RFFE bus. The RFFE bus may also be used to write the configuration information into the holding registers 612.

When a new angle 516, 616 $\Theta$ for the propagation path 510, 610 is desired, a new $\Delta\Phi(\Theta)$ offset is computed. In a swept beam system, a new $\Theta$ value may be desired quite rapidly depending on the application. In one example, the antenna array 506, 606 is switched between five beam directions: {−80°, −40°; 0°; 40°; 80°}. The antenna array 506, 606 may be operated such that it dwells for a duration of time (time slot) at each beam direction, where the same or different dwell times can be defined for different time slots. A unique phase offset between antennas ($\Delta\Phi(\Theta)$) can be calculated for each time slot and its corresponding beam direction $\Theta$. In an example where dwell time of one microsecond is defined for each angle, a complete sweep of the five beam directions is performed in approximately 5 microseconds.

Figure 7:
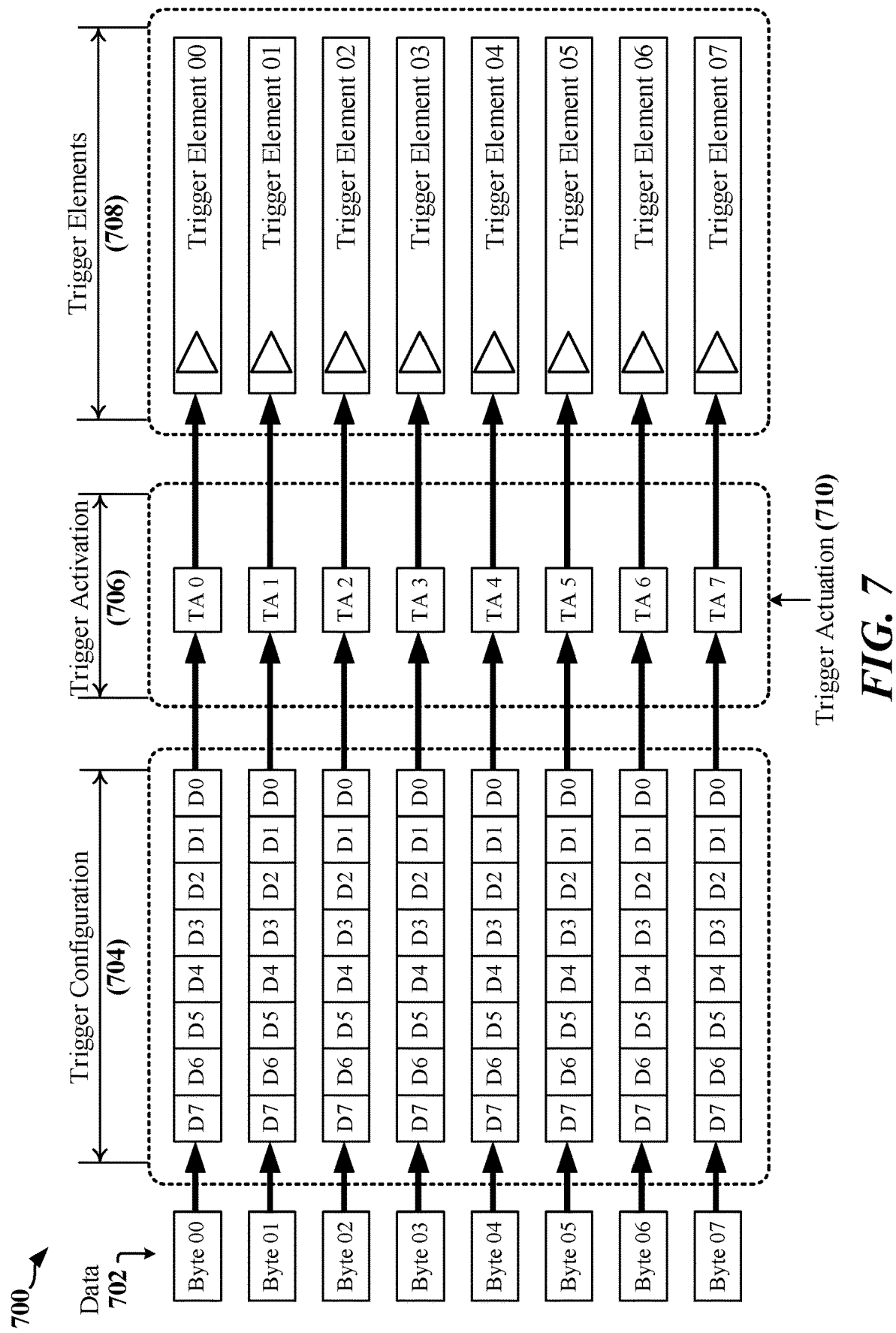
FIG. 7 illustrates triggered activation of configuration changes in a radio frequency front-end in accordance with certain aspects disclosed herein.

FIG. 7 illustrates a scheme 700 for triggered activation of configuration changes in an RF front-end. In the illustrated example, configuration information is received as a plurality of data bytes 702. In other examples, configuration information may be supplied in other units of data, including nibbles, words and/or data units with a configurable number of bits. In the illustrated example, the plurality of data bytes 702 includes eight data bytes, which may be stored in trigger configuration registers 704. In some examples, different-sized data units may be provided as configuration information to different trigger configuration registers 704. The trigger configuration registers 704 may be written in a configuration transaction conducted over a serial bus, which may be operated in accordance with an RFFE protocol. The contents of the trigger configuration registers 704 may be forwarded to a target for configuration using a trigger activation procedure.

Trigger activation logic 706 may be configured to enable the contents of the trigger configuration registers 704 to be transferred to respective target devices in response to a trigger command or trigger actuation signal 710 received from a controlling device. In conventional systems, one or more trigger actuation commands may be transmitted to trigger the activation of configuration of at least a portion of targeted trigger elements 708. The trigger elements 708 may include switches 324, LNAs 326, 328, PAs 320 and other types of device that operate concurrently in an RF front-end. In one example, a trigger actuation transmission may configure a mask or gating logic that determines which trigger elements 708 will receive data from the trigger configuration registers 704 during actuation initiated by the trigger actuation signal 710. The trigger actuation signal 710 may be initiated at the end of a datagram used to carry a trigger actuation command, which may be provided in accordance with a datagram structure 400, 420 for a Register Write command or an Extended Register Write command illustrated in FIG. 4.

Advances in RF technology and the introduction of increased capabilities in communication devices increase pressure on latency times. For example, the deployment of radio access technologies such as the 5G New Radio technology defined by the 3rd Generation Partnership Project (3GPP) and the 802.11ax WLAN standard defined by the Institute of Electrical and Electronics Engineers (IEEE) 802.11 Working Group can require a 50% reduction in latency at conventional bus clock frequencies. In one example, 5G and 802.11ax networks use antenna arrays to implement beamforming/beam steering to increase network capacity, and these networks typically require rapid changes in beam direction that can be achieved only when reconfiguration is accomplished with low latency.

Certain aspects disclosed herein define structures for low-latency datagrams that can be used to significantly reduce bus latency by reducing clock-cycle overhead. In one example, clock-cycle overhead may be calculated as the number of clock cycles used to transmit the fields in an RFFE datagram that do not carry payload data.

FIG. 8 illustrates a trigger activation datagram 800 that may initiate the trigger actuation signal 710 used to transfer information into one or more trigger elements 708. The trigger activation datagram 800 has a clock-cycle overhead of 25 clock cycles. The trigger activation datagram 800 may be defined by conventional RFFE protocols and has multiple fields 802, each field consuming one or more clock cycles 804. Transmission of the trigger activation datagram 800 is initiated using an SSC 806 transmitted over two clock cycles. A slave address 808 (4 clock cycles) precedes transmission of a command code 810 (8 clock cycles) and its parity bit 812 (one cycle). The trigger activation payload 814 is then transmitted. In the example, a one-byte trigger activation payload 814 is transmitted with one bit of parity 816 over a total of 9 clock cycles. The trigger activation datagram 800 is terminated by a bus park cycle (BPC 818) that consumes one clock cycle. The minimum length trigger actuation transaction using the trigger activation datagram 800 is 0.65 µs for a 38.4 MHz clock signal. Transaction-based trigger activation and/or actuation may be unable to meet timing requirements of many applications if consecutive triggers are needed in less than this 25 cycles.

FIG. 9 illustrates a conventional Extended Register Write datagram 900 and a first low-latency datagram 920 that may be used to carry a low-latency Trigger-Activation command. The conventional Extended Register Write datagram 900 has a clock-cycle overhead of 25 clock cycles. The clock-cycle overhead includes the clock cycles used to transmit the SSC 902, device or group identifier 904, a command field 906 (and parity), an address field 908 (and parity) and bus park cycle 912. One or more trigger activation bytes may be carried in the payload 910 of the conventional Extended Register Write datagram 900.

A first low-latency datagram 920 has a clock-cycle overhead of 16 clock cycles, which is a reduction of 36% in clock-cycle overhead (reduction of 9 clock cycles) with respect to the conventional Extended Register Write datagram 900. The first low-latency datagram 920 carries a Low-Latency Trigger-Activation LLTA command code that eliminates the need for a register address field. The LLTA command code is transmitted with a parity bit in a command field 926. The clock-cycle overhead for the first low-latency datagram 920 includes the clock cycles used to transmit the SSC 922, device or group identifier 924, the command field 926 and the bus park cycle 930. One or more trigger activation bytes may be carried in the payload 928 of the first low-latency datagram 920.

In one example, devices coupled to an RFFE bus may be adapted to recognize the LLTA command code, and to automatically direct the payload 928 of the first low-latency datagram 920 to preconfigured register addresses. The LLTA command code may indicate the number of bytes of Trigger-Activation information in the payload 928. The transmission of the bus park cycle 930 at the end of the low-latency datagram 920 may be used by the receiver as a trigger to activate the configuration defined by the payload 928 transmitted in the low-latency datagram 920. In an example where the payload 910, 928 carries two bytes, the first low-latency datagram 920 has a total latency that may be expressed as 34 clock cycles, which is a reduction of 20.9% over the total latency of the conventional Extended Register Write datagram 900.

FIG. 10 illustrates a conventional Extended Register Write datagram 1000 and a second low-latency datagram 1020 that may include a reserved device or group identifier that may be referred to herein as a Magic-ID. The conventional Extended Register Write datagram 1000 has a clock-cycle overhead of 25 clock cycles. The clock-cycle overhead includes the clock cycles used to transmit the SSC 1002, device or group identifier 1004, a command field 1006 (and parity), an address field 1008 (and parity) and bus park cycle 1012. One or more trigger activation bytes may be carried in the payload 1010 of the conventional Extended Register Write datagram 1000.

A second low-latency datagram 1020 has a clock-cycle overhead of 7 clock cycles when the Magic-ID 1024 includes a parity bit, which is a reduction of 72% in clock-cycle overhead (reduction of 18 clock cycles) with respect to the conventional Extended Register Write datagram 1000. A further reduction of one clock-cycle may be obtained when the Magic-ID 1024 is transmitted without a parity bit. The second low-latency datagram 1020 carries the Magic-ID 1024 that eliminates the need for a command code and a register address field. Slave devices recognize that the Magic-ID 1024 as indicating a trigger activation command directed to preconfigured registers. The clock-cycle overhead for the second low-latency datagram 1020 includes the clock cycles used to transmit the SSC 1022, Magic-ID 1024 and the bus park cycle 1028. One or more trigger activation bytes may be carried in the payload 1026 of the second low-latency datagram 1020.

In one example, one or more devices coupled to an RFFE bus may be adapted to respond to the Magic-ID 1024. These devices may respond to the Magic-ID 1024 by processing the payload 1026 in the second low-latency datagram 1020. The payload 1026 may be written to registers at preconfigured register addresses. In some instances, the Magic-ID 1024 may implicitly or explicitly indicate the number of bytes of Trigger-Activation information in the payload 1026. For example, different Magic-ID values may be defined for different payload sizes and devices that receive the second low-latency datagram 1020 may be configured with information that defines payload size and/or the starting address of registers that are to receive the payload 1026.

The transmission of the bus park cycle 1028 (i.e., the end of the low-latency datagram 1020) may be used by the receiver as a trigger to activate the configuration defined by the payload 1026 transmitted in the low-latency datagram 1020. In an example where the payload 1010, 1026 carries two bytes, the first low-latency datagram 1020 has a total latency that may be expressed as 27 clock cycles, which is a reduction of 41.8% over the total latency of the conventional Extended Register Write datagram 1000.

Devices that are the target of low-latency datagrams 920, 1020 may be configured with information that defines trigger activation procedures. In one example, the address of the first register to be written and/or the size of payloads 928, 1026 may be maintained in one or more registers.

Figure 11:
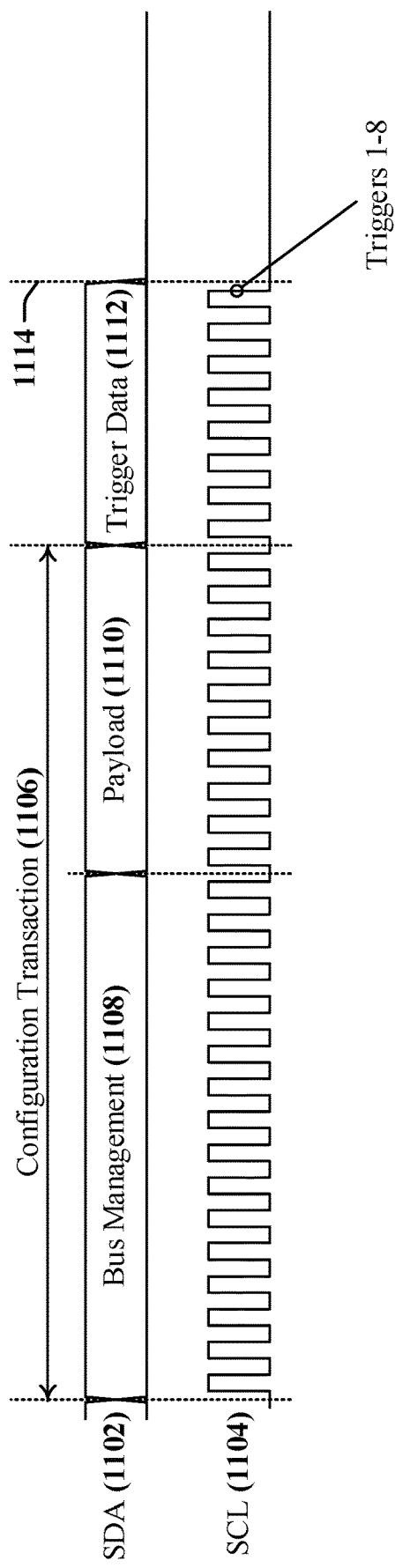
FIG. 11 illustrates a first datagram used to define and actuate one or more transaction-based triggers in accordance with certain aspects disclosed herein.

FIG. 11 illustrates a first datagram 1100 used to define and actuate one or more transaction-based triggers. Timing of data transmitted on the SDA 1102 is controlled by a clock signal transmitted on SCL 1104. A configuration transaction 1106 includes bus management fields 1108 (e.g., address and command fields) and a data payload 1110 (the "action"). In one example, the data payload 1110 includes configuration data directed to one or more trigger elements 708. Actions typically occur at some point in time 1114 after the end of the configuration transaction 1106, generally according to timing established by the slave device. A trigger data byte 1112 may be transmitted after the data payload 1110. The trigger data byte 1112 may define one or more potential triggers that can be initiated by the datagram 1100. The operation of transaction-based triggers is asynchronous in nature. Triggers may be executed according to the content of the trigger data byte 1112 that is transmitted after each configuration transaction 1106. In some examples, triggers addressed in each trigger data byte 1112 can be actuated after transmission of the trigger data byte 1112.

Figure 12:
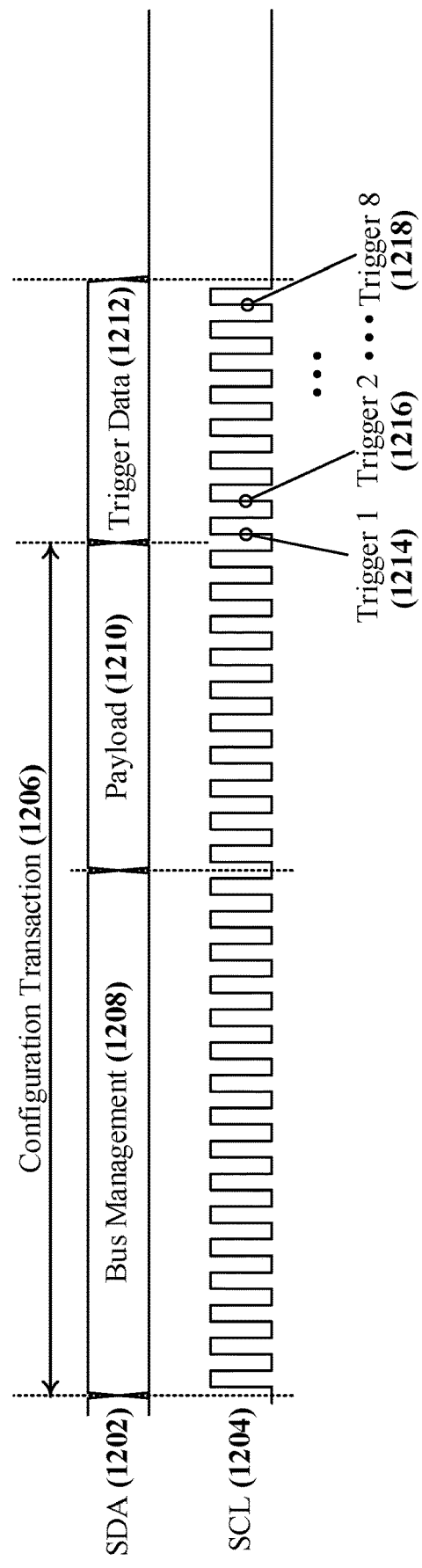
FIG. 12 illustrates a second datagram used to define and actuate one or more transaction-based triggers in accordance with certain aspects disclosed herein.

FIG. 12 illustrates a second datagram 1200 used to define and actuate one or more transaction-defined triggers 1214, 1216, 1218. Timing of data transmitted on the SDA 1202 is controlled by a clock signal transmitted on SCL 1204. A configuration transaction 1206 includes bus management fields 1208 (e.g., address and command fields) and a data payload 1210 including one or more actions. In one example, the data payload 1210 includes configuration data directed to one or more trigger elements 708. Actions may be initiated after a bit data of a trigger data byte 1212 corresponding to the action is received and indicates that the trigger 1214, 1216, 1218 is to be actuated. The trigger data byte 1212 is transmitted after the data payload 1210. Triggers 1214, 1216, 1218 are executed according to the content of the trigger data byte 1212 that is transmitted after each configuration transaction 1206. The trigger data byte 1212 may relate to one or more potential triggers that can be initiated by the second datagram 1200 and the value of each bit of the trigger data byte 1212 may define whether the trigger 1214, 1216, 1218 is to be actuated.

Figure 13:
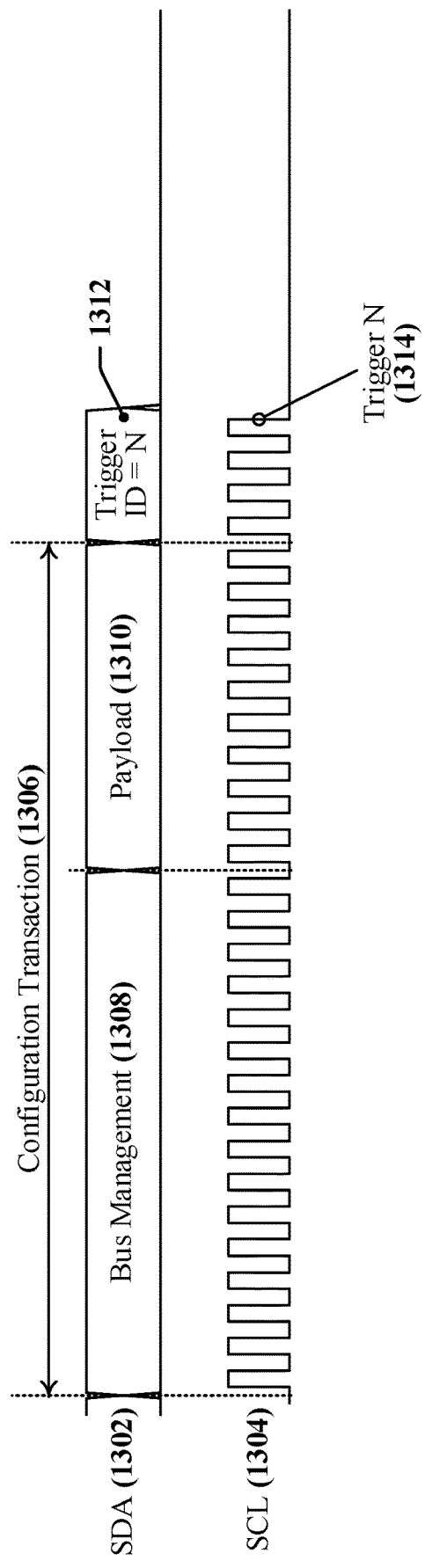
FIG. 13 illustrates a third datagram used to define and actuate one or more transaction-based triggers in accordance with certain aspects disclosed herein.

FIG. 13 illustrates a third datagram 1300 used to define and actuate one or more transaction-based triggers. Timing of data transmitted on the SDA 1302 is controlled by a clock signal transmitted on SCL 1304. A configuration transaction 1306 includes bus management fields 1308 (e.g., address and command fields) and a data payload 1310 including one or more actions. In one example, the data payload 1310 includes configuration data directed to one or more trigger elements 708. Actions may be identified by a field (Trigger ID field 1312) transmitted after the data payload 1310. In the illustrated example, a four-bit trigger identifier is transmitted in the Trigger ID field 1312. The action identified by the trigger identifier is initiated 1314 after the Trigger ID field 1312 has been received. More than one Trigger ID field 1312 may be transmitted. The size of the Trigger ID field 1312 may be defined based on application needs. The trigger identifier may define multiple actions to be triggered simultaneously. The meaning and effect of the trigger identifier may be defined in one or more configuration registers.

Figure 14:
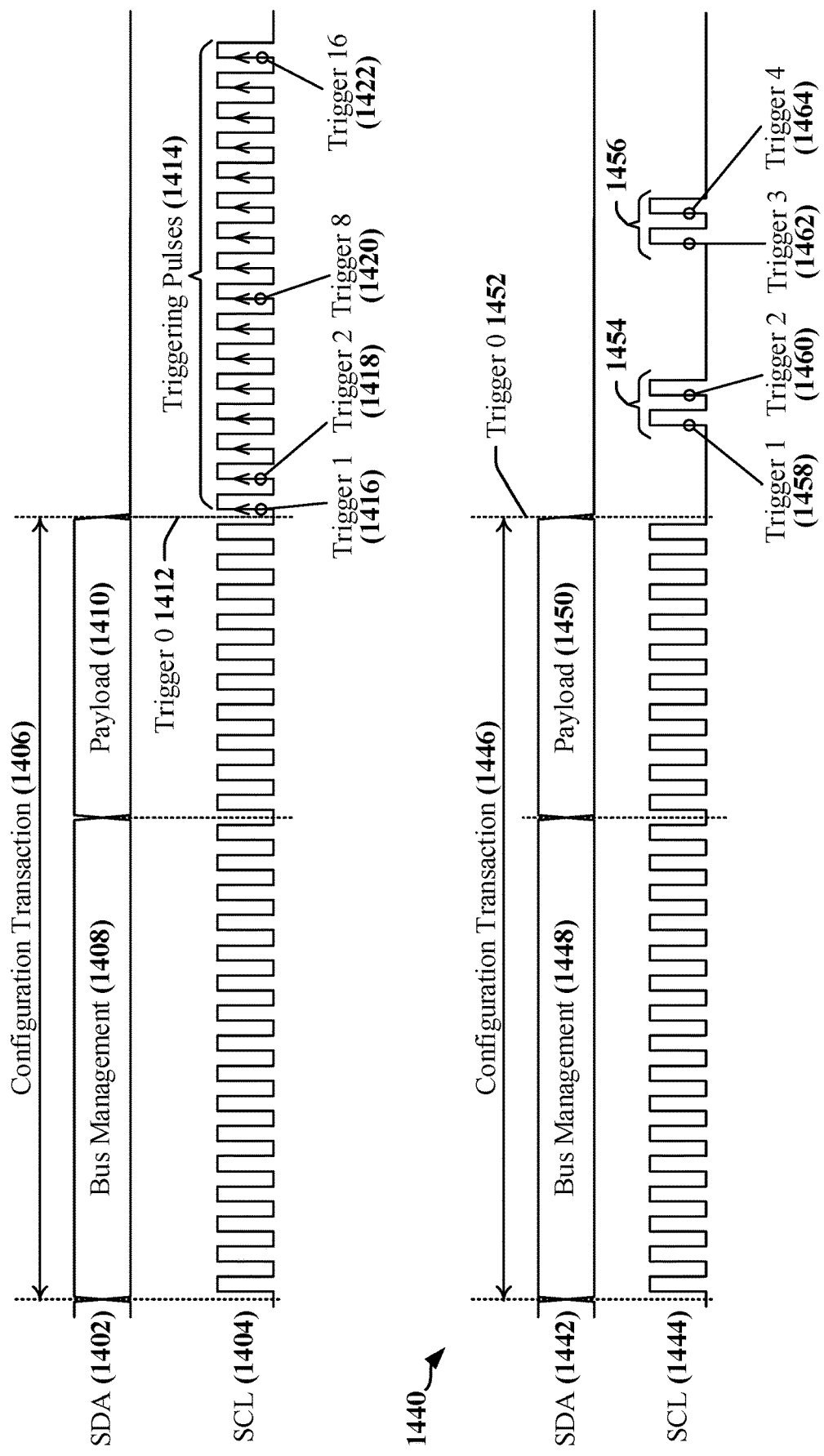
FIG. 14 illustrates fourth and fifth datagrams used to define and actuate one or more transaction-based triggers in accordance with certain aspects disclosed herein.

FIG. 14 illustrates a fourth datagram 1400 used to define and actuate one or more transaction-defined triggers. Timing of data transmitted on the SDA 1402 is controlled by a clock signal transmitted on SCL 1404. The actuation of triggers is also controlled by the clock signal. A configuration transaction 1406 includes bus management fields 1408 (e.g., address and command fields) and a data payload 1410 including one or more actions. In one example, the data payload 1410 includes configuration data directed to one or more trigger elements 708. Actions may be initiated on one or more edges of a set of pulses 1414 transmitted in the clock signal. In the illustrated example, the set of pulses 1414 are transmitted after the data payload 1410. A first action (Trigger 0 1412) may actuated at the termination of the data payload 1410. In the illustrated example, the set of pulses 1414 includes 16 pulses and actuates up to 16 actions or 16 combinations of actions. For example, a slave device may be configured to actuate 4 actions (triggers 1416, 1418, 1420 and 1422) provided in the data payload 1410 or received in a previous transaction.

A slave device may be configured with information that associates actions with edges in the set of pulses 1414. Configuration information may also define the number of pulses in the set of pulses 1414. In some examples, each edge in the set of pulses 1414 may be configured to trigger the transfer of the content of one or more trigger configuration registers 704 into corresponding trigger elements 708. The order of triggering actions need not match the order in which actions are transmitted in the data payload 1410. For example, the assignment of triggers to pulses may be configured to define an order of the actions. In some instances, configuration information may define group repeat options. In one example, a slave device may be configured to repeat groups of triggers N times, where the group includes triggers 2, 4 and 6.

Trigger order may be preconfigured in each slave device. Different slave devices may have a different preconfigured order. Two or more slave devices may have the same preconfigured order. In one example, a default 16-bit trigger order may be defined as {T0, T1, T2, T3, T4, T5, T6, T7, T8, T9, T10, T11, T12, T13, T14, T15, T16}, whereas and alternate trigger order may prioritize triggers in reverse order {T16, T15, T14, T13, T12, T11, T10, T9, T8, T7, T6, T5, T4, T3, T2, T1, T0}. Any trigger order may be provided, and trigger order may be selected based on timing priorities. Repeated triggers may be configured (e.g. Trigger {T0, T0, T0, T0} 3 times), and repeated groups of triggers may be configured (e.g. Repeat Group Trigger {T2, T4, T6} 3 times).

FIG. 14 also illustrates a fifth datagram 1440, which represents a first additional aspect of the fourth datagram 1400. The fifth datagram 1440 may be used to define and actuate one or more transaction-based triggers. Timing of data transmitted on the SDA 1442 is controlled by a clock signal transmitted on SCL 1444. The actuation of triggers is also controlled by the clock signal. A configuration transaction 1446 includes bus management fields 1448 (e.g., address and command fields) and a data payload 1450 including one or more actions. In one example, the data payload 1450 includes configuration data directed to one or more trigger elements 708. Actions may be initiated on one or more edges of sets of pulses 1454, 1456 transmitted in the clock signal. In the illustrated example, the sets of pulses 1454, 1456 are transmitted after the data payload 1450. A first action (Trigger 0 1452) may actuated at the termination of the data payload 1450. In the illustrated example, two sets of pulses 1454, 1456 each includes 2 pulses. The two sets of pulses 1454, 1456 may be configured to provide a timed combination of triggers 1458, 1460, 1462, 1464. A slave device may be configured to actuate 4 actions (triggers 1458, 1460, 1462, 1464) provided in the data payload 1450 or received in a previous transaction at the time indicated by a corresponding edge of a clock pulse.

A slave device may be configured with information that associates actions with edges in the set of pulses 1454. Configuration information may also define the number of pulses in the set of pulses 1454. In some examples, each edge in the set of pulses 1454 may be configured to trigger the transfer of the content of one or more trigger configuration registers 704 into corresponding trigger elements 708. The order of triggering actions need not match the order in which actions are transmitted in the data payload 1450. For example, the assignment of triggers to pulses may be configured to define an order of the actions. In some instances, configuration information may define group repeat options. In one example, a slave device may be configured to repeat groups of triggers N times, where the group includes triggers 2, 4 and 6.

In the examples illustrated by the fourth datagram 1400 and the fifth datagram, triggers can occur once for every master clock cycle. For a master clock that has frequency of 50 MHz, a trigger can be initiated every 20 ns after the data payload 1410, 1450 has been received. Furthermore, the master clock may be manipulated to provide a stretched clock cycle to separate triggers in time as dictated or desired by application.

Figure 15:
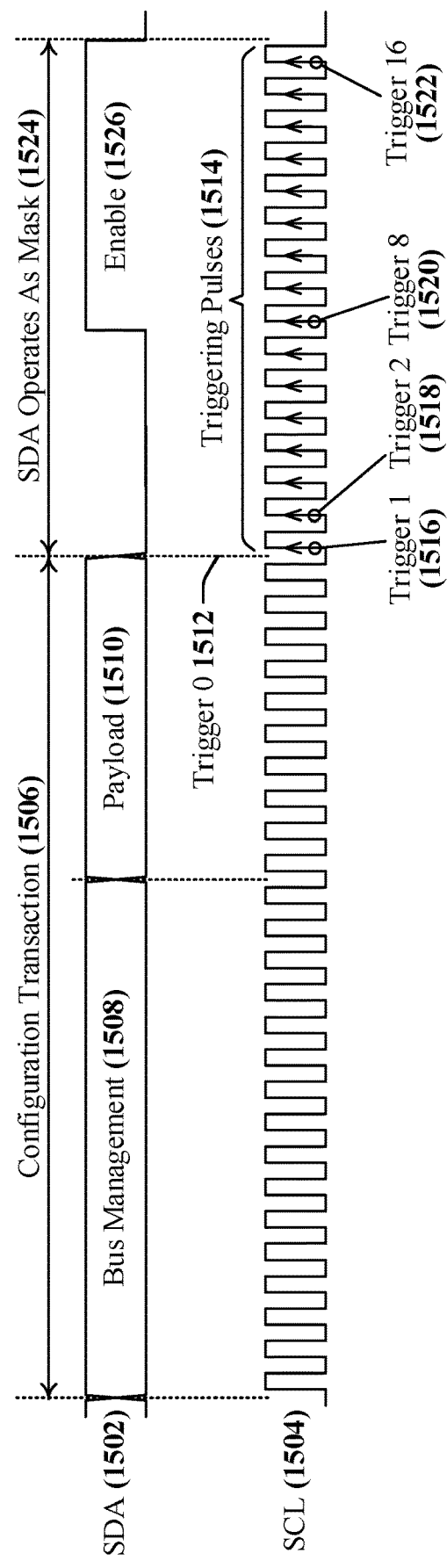
FIG. 15 illustrates a sixth datagram illustrating certain addition aspects of the datagrams illustrated in FIG. 14 and in accordance with certain aspects disclosed herein.

FIG. 15 illustrates a sixth datagram 1500, which represents a second additional aspect of the fourth datagram 1400. The sixth datagram 1500 may be used to select triggers to be actuated by a set of pulses 1514 provided in the clock signal transmitted on SCL 1504 to control timing of data transmitted on the SDA 1502. A configuration transaction 1506 includes bus management fields 1508 (e.g., address and command fields) and a data payload 1510 including one or more actions. In one example, the data payload 1510 includes configuration data directed to one or more trigger elements 708. Slave devices may be configured to initiate actions based on the timing of one or more edges in the set of pulses 1514.

In accordance with the second additional aspect, SDA 1502 operates as a mask (in the masking period 1524) to permit the transmitter to select actions to be initiated. For each pulse in the set of pulses 1514, initiation of actions is enabled when SDA 1502 is in a first state (here, the high signaling state) and disabled when SDA 1502 is in a second state (here, the low signaling state). In other implementations, a high signaling state may disable action initiation and a low signaling state may enable action initiation at a slave device. SDA 1502 may be switched between one or more pairs of the set of pulses 1514. In some instances, SDA 1502 may toggle between each pair of pulses in the set of pulses 1514. In the illustrated example, SDA 1502 is controlled to provide an enable period 1526 covering the last nine pulses of the 16 pulses in the set of pulses 1514, where initiation of actions is disabled for the first seven pulses. In some instances, a first action (Trigger 0 1512) may be actuated at the termination of the data payload 1510 regardless of the state of SDA 1502. SDA 1502 may carry masking information as well as trigger data. For example, the trigger data byte 1112, 1212 illustrated in FIGS. 11 and 12 may be transmitted on SDA 1102, 1202 with masking. In some instances, the trigger data byte 1112, 1212 can alternate with trigger data mask values such that a mask value may apply to the preceding data value. Such alternating modes can be preconfigured.

In the illustrated example, the set of pulses 1514 are transmitted after the data payload 1510. Trigger 0 1512 may be actuated at the termination of the data payload 1510. In the illustrated example, the set of pulses 1514 includes 16 pulses and actuates up to 16 actions or 16 combinations of actions. For example, a slave device may be configured to actuate 4 actions (triggers 1516, 1518, 1520 and 1522) provided in the data payload 1510 or received in a previous transaction.

A slave device may be configured with information that associates actions with edges in the set of pulses 1514. Configuration information may also define the number of pulses in the set of pulses 1514. In some examples, each edge in the set of pulses 1514 may be configured to trigger the transfer of the content of one or more trigger configuration registers 704 into corresponding trigger elements 708, provided the state of SDA 1502 is in the high state. The order of triggering actions need not match the order in which actions are transmitted in the data payload 1510. For example, the assignment of triggers to pulses may be configured to define an order of the actions. In some instances, configuration information may define group repeat options. In one example, a slave device may be configured to repeat groups of triggers N times, where the group includes triggers 2, 4 and 6.

In the examples illustrated by the sixth datagram 1500, triggers can occur once for every master clock cycle. For a master clock that has frequency of 50 MHz, a trigger can be initiated every 20 ns after the data payload 1510 has been received. Furthermore, the master clock may be manipulated to provide a stretched clock cycle to separate triggers in time as dictated or desired by application.

FIG. 16 illustrates transmissions 1600, 1620 that can be used to mask selected trigger initiations. An initiating transmission 1606, 1626 may precede clock-based triggers. The initiating transmission 1606, 1626 may correspond to the configuration transactions 1206, 1306, 1406, 1506 illustrated in FIGS. 11-15. One or more previously-transmitted datagrams may provide trigger activation information. The preconfigured actions may be provided in a previously-transmitted register write datagram. In some implementations, a sequence of triggers may be provided that loads one of a group of preloaded configuration values into one or more trigger elements 708.

In each of the illustrated transmissions 1600, 1620 eight clock pulses are assigned to a function 1610, 1630. Each function 1610, 1630 may include or relate to a trigger or combination of triggers, actuated by the set of pulses 1612, 1632 provided in the clock signal transmitted on SCL 1604, 1624. Slave devices may be configured to initiate actions based on the timing of one or more edges in the set of pulses 1612, 1632. In some implementations, an enable signal transmitted on SDA 1602, 1622 can be used to select functions 1610, 1630 to be initiated on an edge of a corresponding pulse in the set of pulses 1612, 1632. In one example, functions 1610, 1630 may be initiated when the enable signal is in a first state 1614, 1618, 1634, 1638 and suppressed when the enable signal is in a second state 1616, 1636.

In the illustrated examples, initiation of actions is enabled when SDA 1602, 1622 is in a first state (here, the high signaling state) and disabled when SDA 1602, 1622 is in a second state (here, the low signaling state). In other implementations, a high signaling state may disable action initiation and a low signaling state may enable action initiation slave device. SDA 1602, 1622 may be switched between one or more pairs of the set of pulses 1612, 1632. In some instances, SDA 1602, 1622 may toggle between each pair of pulses in the set of pulses 1612, 1632. In the illustrated example, SDA 1602, 1622 is controlled to provide enable periods (first state 1614, 1618, 1634, 1638) and initiation of actions is disabled during disable periods (second state 1616, 1636).

In accordance with certain aspects, the set of pulses 1612, 1632 is preceded by an initiating transmission 1606, 1626. The set of pulses 1612, 1632 may be terminated with a bus park cycle 1608, 1628.

The second transmission 1620 illustrates an example of clock manipulation that may be used to control timing between triggered functions 1630. One or more pulses may be provided with a shortened clock cycle 1640, while one or more other pulses may have a stretched clock cycle 1642. In some instances, clock period adjustments may be balanced to maintain a common duration of the transmissions 1600, 1620.

A slave device may be configured with information that associates actions with edges in the set of pulses 1612, 1632. Configuration information may also define the number of pulses in the set of pulses 1612, 1632. In some examples, each edge in the set of pulses 1612, 1632 may be configured to trigger the transfer of the content of one or more trigger configuration registers 704 into corresponding trigger elements 708, provided the state of SDA 1602, 1622 is in the high state. Triggers may be assigned to pulses in order to define an order of functions 1610, 1630 to be initiated. In some instances, configuration information may define group repeat options.

In the examples illustrated in FIG. 16, triggers can occur once for every master clock cycle. For a master clock that has frequency of 50 MHz, a trigger can be initiated every 20 ns after the initiating transmission 1606, 1626 has been received. Furthermore, the master clock may be manipulated to provide a stretched clock cycle to separate triggers in time as dictated or desired by application.

Figure 17:
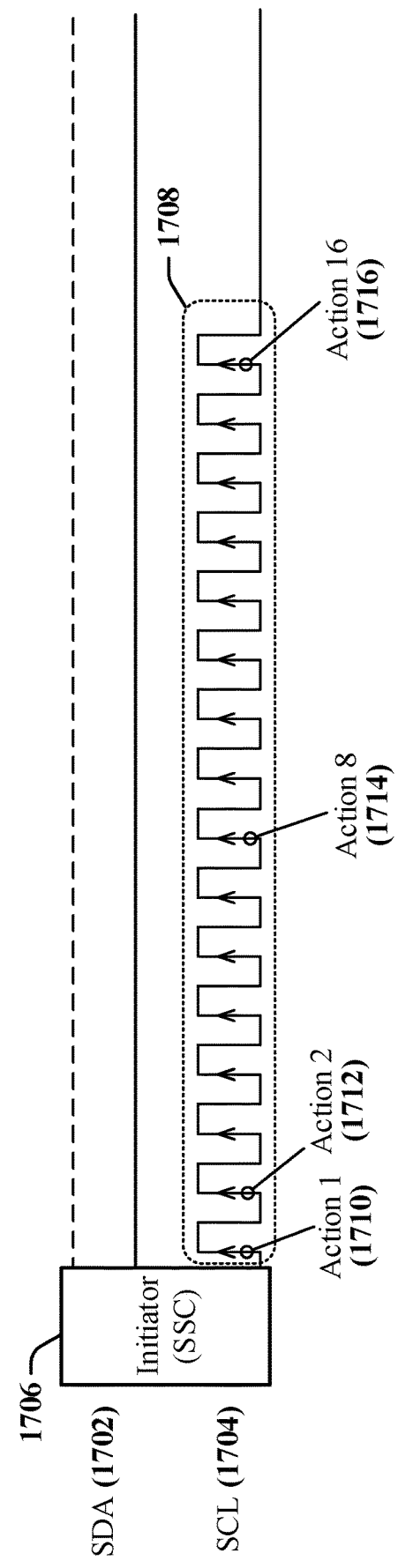
FIG. 17 illustrates a transmission that can be used to minimize latency of triggering in certain applications in accordance with certain aspects disclosed herein.

FIG. 17 illustrates a transmission 1700 that can be used to minimize latency of triggering in certain applications. In accordance with certain aspects, a set of pulses 1708 transmitted on SCL 1704 is preceded by an initiating transmission 1706 indicating that the set of pulses 1708 is transmitted without a conventional datagram. The initiating transmission 1706 may be implemented as a combination of signaling on SDA 1702 and/or SCL 1704 while the serial bus is idle. In one example, the serial bus is operated in accordance with an RFFE protocol and the initiating transmission 1706 is a modified SSC.

The initiating transmission 1706 precedes the set of pulses 1708 that control timing of clock-based triggers 1710, 1712, 1714, 1716. One or more previously-transmitted datagrams may provide trigger activation information. The preconfigured actions may be provided in a previously-transmitted register write datagram. In some implementations, a sequence of triggers may be provided that loads one of a group of preloaded configuration values into one or more trigger elements 708. In one example, one or more sequences of triggers may facilitate rapid beam steering in a radio-frequency front end, where the latency of the triggering transmission can be calculated as the number of pulses in the set of pulses 1708 plus a few additional bus clock cycles.

In the illustrated transmission 1700, sixteen clock pulses may be associated with a trigger or some combination of triggers. Each function may include or relate to a trigger or combination of triggers, actuated by the set of pulses 1708 provided in the clock signal transmitted on SCL 1704. Slave devices may be configured to initiate actions based on the timing of one or more edges in the set of pulses 1708. In some implementations, an enable signal transmitted on SDA 1702 can be used to select functions to be initiated on an edge of a corresponding pulse in the set of pulses 1708.

A slave device may be configured with information that associates actions with edges in the set of pulses 1708. Configuration information may also define the number of pulses in the set of pulses 1708. In some examples, each edge in the set of pulses 1708 may be configured to trigger the transfer of the content of one or more trigger configuration registers 704 into corresponding trigger elements 708. Triggers may be assigned to pulses in order to define an order of functions to be initiated. In some instances, configuration information may define group repeat options.

In the examples illustrated in FIG. 17, triggers can occur once for every master clock cycle. For a master clock that has frequency of 50 MHz, a trigger can be initiated every 20 ns after the initiating transmission 1706 has been transmitted. Furthermore, the master clock may be manipulated to provide a stretched clock cycle to separate triggers in time as dictated or desired by application.

FIG. 18 illustrates certain clock signal configurations 1800, 1840 that can optimize latency when clock based triggering is implemented, including the various implementations illustrated in FIGS. 12-17. Clock-based triggering in accordance with certain aspects disclosed herein may provide single-trigger granularity. For example, a transmission may provide a single trigger, or any number (N) triggers. A transmission may include an initiator 1802, 1812, 1822, 1842, 1852, 1862 preceding one or more pulses 1808, 1818, 1828, 1848, 1858, 1868 of the clock signal. The transmission may be terminated by a bus park cycle or other terminator 1804, 1814, 1824, 1844, 1854, 1864. The first clock signal configuration 1800 illustrates one example, in which triggers are actuated on one edge of each of the pulses 1808, 1818, 1828. The second clock signal configuration 1840 illustrates another example, in which triggers are actuated on both edges of each of the pulses 1848, 1858, 1868. In another example, one or more triggers may be actuated at the end 1806, 1816, 1826, 1846, 1856, 1866 of the terminator 1804, 1814, 1824, 1844, 1854, 1864.

Figure 19:
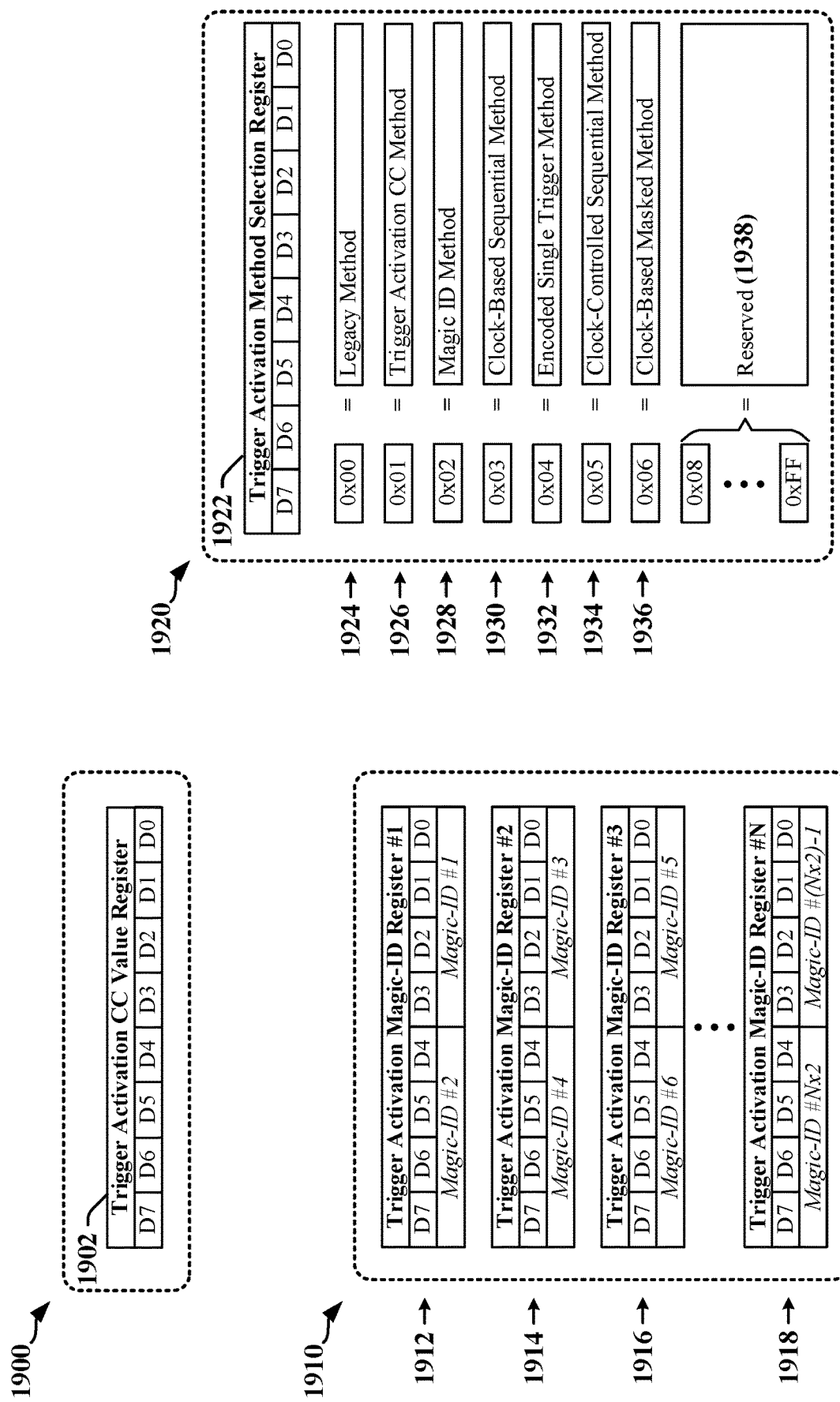
FIG. 19 illustrates examples of configuration information maintained by devices adapted to receive low-latency datagrams in accordance with certain aspects disclosed herein.

FIG. 19 illustrates examples of configuration information 1900, 1910, 1920 that may be maintained by devices adapted to receive low-latency triggers transmitted in accordance with certain aspects disclosed herein. In a first example of configuration information 1900, one or more registers 1902 may be configured with a Trigger-Activation command code that may be used when trigger activation is transmitted to initiate one or more triggers. Multiple Trigger-Activation command codes may be defined when Trigger-Activation information. In some instances, a protocol handler, which may be implemented using a finite state machine, may be adapted to compare command codes received from a serial bus with a register 1902 that defines a Trigger-Activation command code.

In a second example of configuration information 1910, one or more registers 1912, 1914, 1916, 1918 may be configured with Magic-IDs. In an RFFE implementation, each register 1912, 1914, 1916, 1918 may store one or two four-bit Magic-IDs. A Magic-ID may identify a single device and/or a group of devices. In some instances, a device may be adapted to respond to multiple Magic-IDs, where each Magic-ID identifies different trigger elements 708 within the device or within multiple devices.

In a third example of configuration information 1920, a mode register 1922 may be configured with mode information that defines the type of Trigger-Activation transmission that is to be handled by a device. A first value 1924 stored in the mode register 1922 may indicate that Trigger-Activation is to be transmitted in conventional or legacy mode datagrams. A second value 1926 stored in the mode register 1922 may indicate that a configured Trigger-Activation command code is to be transmitted in a datagram that includes no address field. A third value 1928 stored in the mode register 1922 may indicate that Trigger-Activation information is to be transmitted in a datagram that includes a Magic-ID. Other values 1930, 1932, 1934, 1936 stored in the mode register 1922 may indicate that a particular type of clock-based Trigger-Activation procedure is to be used. In some implementations, the number of clock pulses, and clock signal configurations 1800, 1840 for clock-based Trigger-Activation may defined in one or more registers. Other values 1938 stored in the mode register 1922 may be defined according to application needs.

Examples of Processing Circuits and Methods

Figure 20:
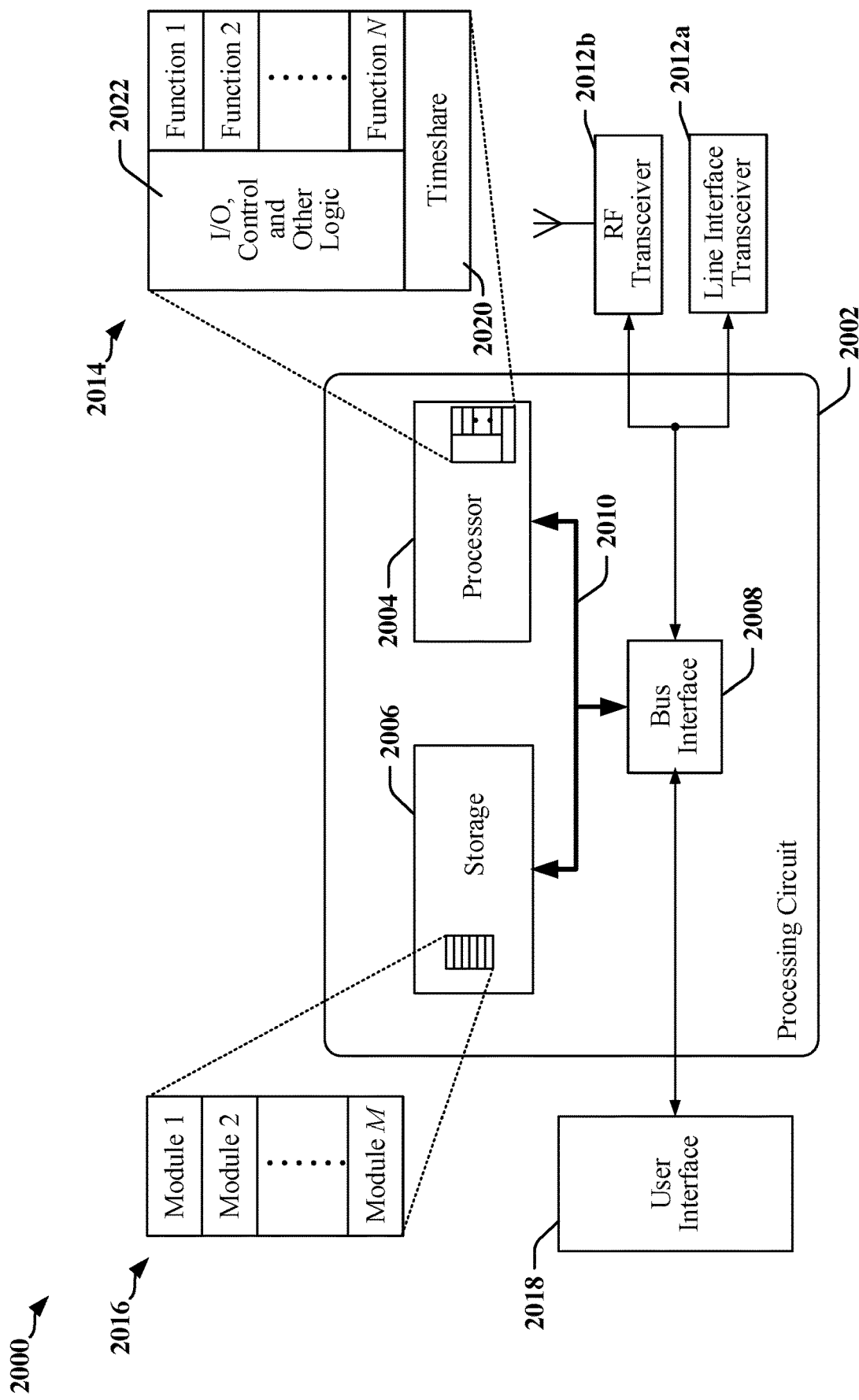
FIG. 20 illustrates one example of an apparatus employing a processing circuit that may be adapted according to certain aspects disclosed herein.

FIG. 20 is a diagram illustrating an example of a hardware implementation for an apparatus 2000. In some examples, the apparatus 2000 may perform one or more functions disclosed herein. In accordance with various aspects of the disclosure, an element, or any portion of an element, or any combination of elements as disclosed herein may be implemented using a processing circuit 2002. The processing circuit 2002 may include one or more processors 2004 that are controlled by some combination of hardware and software modules. Examples of processors 2004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2004 may include specialized processors that perform specific functions, and that may be configured, augmented or controlled by one of the software modules 2016. The one or more processors 2004 may be configured through a combination of software modules 2016 loaded during initialization, and further configured by loading or unloading one or more software modules 2016 during operation.

In the illustrated example, the processing circuit 2002 may be implemented with a bus architecture, represented generally by the bus 2010. The bus 2010 may include any number of interconnecting buses and bridges depending on the specific application of the processing circuit 2002 and the overall design constraints. The bus 2010 links together various circuits including the one or more processors 2004, and storage 2006. Storage 2006 may include memory devices and mass storage devices, and may be referred to herein as computer-readable media and/or processor-readable media. The bus 2010 may also link various other circuits such as timing sources, timers, peripherals, voltage regulators, and power management circuits. A bus interface 2008 may provide an interface between the bus 2010 and one or more transceivers 2012a, 2012b. A transceiver 2012a, 2012b may be provided for each networking technology supported by the processing circuit. In some instances, multiple networking technologies may share some or all of the circuitry or processing modules found in a transceiver 2012a, 2012b. Each transceiver 2012a, 2012b provides a means for communicating with various other apparatus over a transmission medium. In one example, a transceiver 2012*a* may be used to couple the apparatus 2000 to a multi-wire bus. In another example, a transceiver 2012*b* may be used to connect the apparatus 2000 to a radio access network. Depending upon the nature of the apparatus 2000, a user interface 2018 (e.g., keypad, display, speaker, microphone, joystick) may also be provided, and may be communicatively coupled to the bus 2010 directly or through the bus interface 2008.

A processor 2004 may be responsible for managing the bus 2010 and for general processing that may include the execution of software stored in a computer-readable medium that may include the storage 2006. In this respect, the processing circuit 2002, including the processor 2004, may be used to implement any of the methods, functions and techniques disclosed herein. The storage 2006 may be used for storing data that is manipulated by the processor 2004 when executing software, and the software may be configured to implement any one of the methods disclosed herein.

One or more processors 2004 in the processing circuit 2002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2006 or in an external computer-readable medium. The external computer-readable medium and/or storage 2006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2006 may also include, by way of example, a carrier wave, a transmission line, and any other suitable medium for transmitting software and/or instructions that may be accessed and read by a computer. Computer-readable medium and/or the storage 2006 may reside in the processing circuit 2002, in the processor 2004, external to the processing circuit 2002, or be distributed across multiple entities including the processing circuit 2002. The computer-readable medium and/or storage 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2006 may maintain software maintained and/or organized in loadable code segments, modules, applications, programs, etc., which may be referred to herein as software modules 2016. Each of the software modules 2016 may include instructions and data that, when installed or loaded on the processing circuit 2002 and executed by the one or more processors 2004, contribute to a run-time image 2014 that controls the operation of the one or more processors 2004. When executed, certain instructions may cause the processing circuit 2002 to perform functions in accordance with certain methods, algorithms and processes described herein.

Some of the software modules 2016 may be loaded during initialization of the processing circuit 2002, and these software modules 2016 may configure the processing circuit 2002 to enable performance of the various functions disclosed herein. For example, some software modules 2016 may configure internal devices and/or logic circuits 2022 of the processor 2004, and may manage access to external devices such as a transceiver 2012*a*, 2012*b*, the bus interface 2008, the user interface 2018, timers, mathematical coprocessors, and so on. The software modules 2016 may include a control program and/or an operating system that interacts with interrupt handlers and device drivers, and that controls access to various resources provided by the processing circuit 2002. The resources may include memory, processing time, access to a transceiver 2012*a*, 2012*b*, the user interface 2018, and so on.

One or more processors 2004 of the processing circuit 2002 may be multifunctional, whereby some of the software modules 2016 are loaded and configured to perform different functions or different instances of the same function. The one or more processors 2004 may additionally be adapted to manage background tasks initiated in response to inputs from the user interface 2018, the transceiver 2012*a*, 2012*b*, and device drivers, for example. To support the performance of multiple functions, the one or more processors 2004 may be configured to provide a multitasking environment, whereby each of a plurality of functions is implemented as a set of tasks serviced by the one or more processors 2004 as needed or desired. In one example, the multitasking environment may be implemented using a timesharing program 2020 that passes control of a processor 2004 between different tasks, whereby each task returns control of the one or more processors 2004 to the timesharing program 2020 upon completion of any outstanding operations and/or in response to an input such as an interrupt. When a task has control of the one or more processors 2004, the processing circuit is effectively specialized for the purposes addressed by the function associated with the controlling task. The timesharing program 2020 may include an operating system, a main loop that transfers control on a round-robin basis, a function that allocates control of the one or more processors 2004 in accordance with a prioritization of the functions, and/or an interrupt driven main loop that responds to external events by providing control of the one or more processors 2004 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 21:
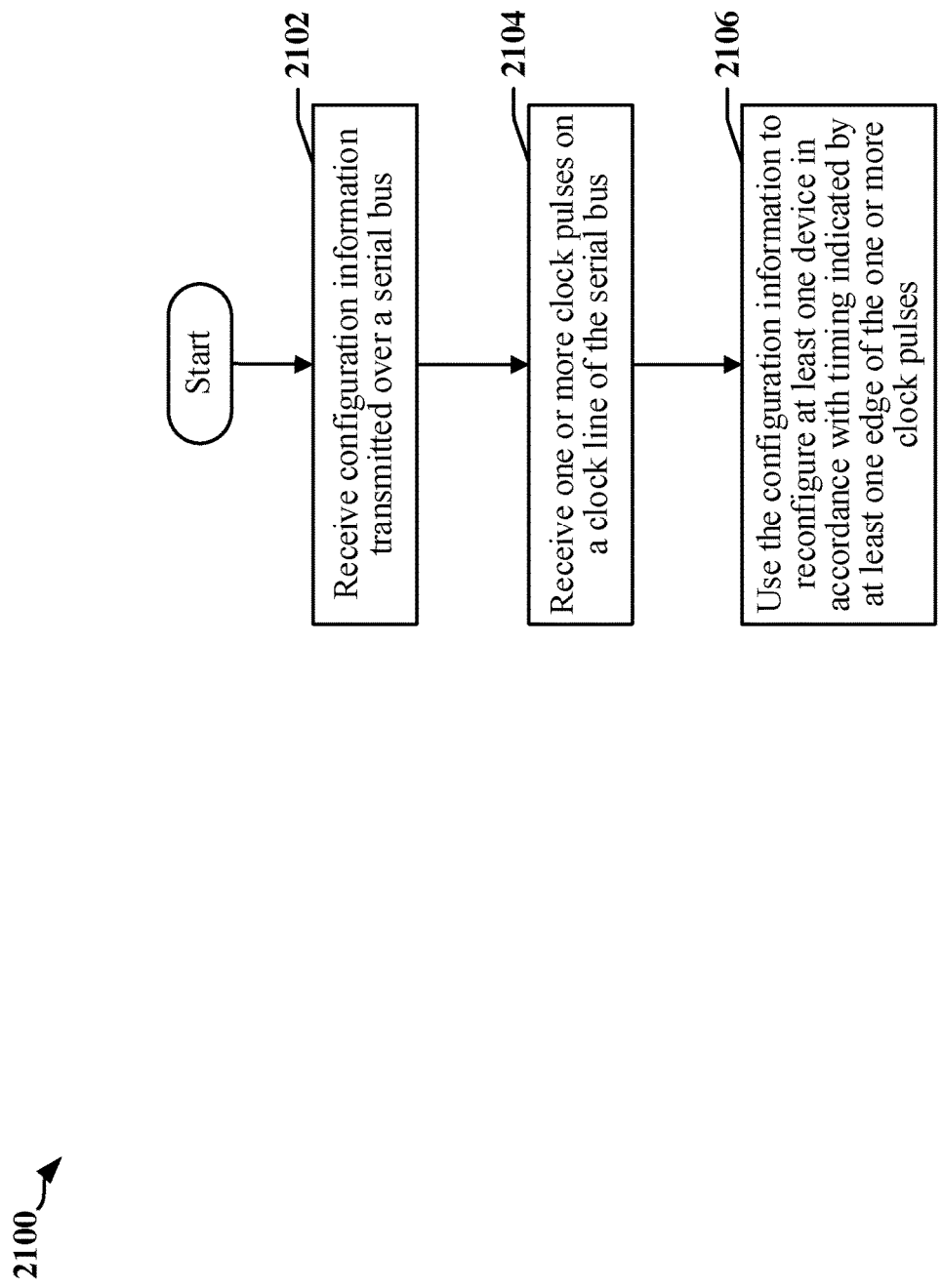
FIG. 21 is a flowchart that illustrates certain aspects disclosed herein.

FIG. 21 is a flowchart 2100 of a method that may be performed by a device coupled to a serial bus. In one example, the serial bus may be operated in accordance with an RFFE protocol. At block 2102, the device may receive configuration information transmitted over a serial bus. At block 2104, the device may receive one or more clock pulses on a clock line of the serial bus. At block 2106, the device may use the configuration information to reconfigure at least one device and in accordance with timing indicated by at least one edge of the one or more clock pulses.

In certain examples, the device may store the configuration information in a first holding register associated with a first trigger, actuate the first trigger after detecting a first edge in the one or more clock pulses, and transfer one or more bits of the first holding register to a register that controls one or more elements of the at least one device when the first trigger is actuated. The device may receive trigger activation information in a datagram that includes at least a portion of the configuration information, and activate the first trigger when indicated by the trigger activation information. The first trigger may be actuated when a data line of the serial bus is in a first signaling state when the first edge is detected. A second trigger may be suppressed when the data line is in a second signaling state when the first edge is detected. The device may receive a trigger identifier in the datagram, after the trigger activation information. The trigger identifier may indicate the first trigger.

In one example, the device may receive trigger activation information in a datagram that includes at least a portion of the configuration information, and actuate the first trigger as a bit of the configuration information is received when the bit activates the first trigger.

In another example, the device may receive trigger activation information in a datagram that includes at least a portion of the configuration information. The one or more clock pulses may be received after the trigger activation information.

In some examples, receiving one or more clock pulses includes receiving a sequence start condition, and receiving the one or more clock pulses upon completion of the sequence start condition. The first trigger may be actuated when a data line of the serial bus is in a first signaling state when the first edge is detected. The second trigger may be suppressed when the data line is in a second signaling state when the first edge is detected.

In some examples, the device may actuate a second trigger after detecting a second edge in the one or more clock pulses, and transfer one or more bits of a second holding register to a second register that controls an element of the at least one device when the second trigger is actuated. A time elapsed between the first edge and the second edge may include a stretched clock period. The first edge may correspond to a signaling transition in a first direction, and the second edge may correspond to a signaling transition in a second direction that is different from the first direction.

Figure 22:
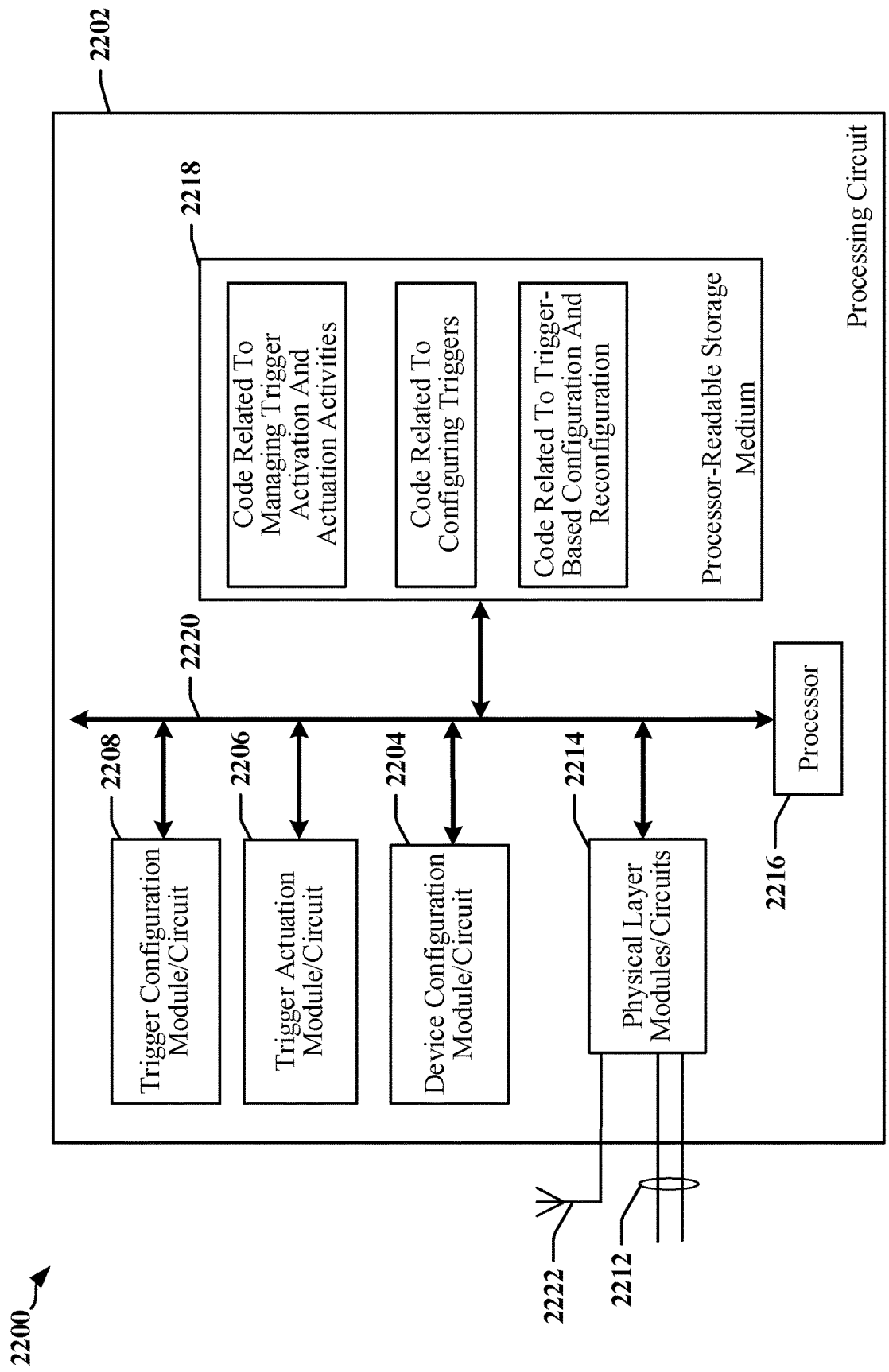
FIG. 22 illustrates an example of a hardware implementation for an apparatus adapted in accordance with certain aspects disclosed herein.

FIG. 22 is a diagram illustrating a simplified example of a hardware implementation for an apparatus 2200 employing a processing circuit 2202. The processing circuit typically has a controller or processor 2216 that may include one or more microprocessors, microcontrollers, digital signal processors, sequencers and/or state machines. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the controller or processor 2216, the modules or circuits 2204, 2206 and 2208 and the processor-readable storage medium 2218. One or more physical layer circuits and/or modules 2214 may be provided to support communications over a communication link implemented using a multi-wire bus 2212, through an antenna or antenna array 2222 (to a radio access network for example), and so on. The bus 2220 may also link various other circuits such as timing sources, peripherals, voltage regulators, and power management circuits, which are well known in the art, and therefore, will not be described any further.

The processor 2216 is responsible for general processing, including the execution of software, code and/or instructions stored on the processor-readable storage medium 2218. The processor-readable storage medium may include a non-transitory storage medium. The software, when executed by the processor 2216, causes the processing circuit 2202 to perform the various functions described supra for any particular apparatus. The processor-readable storage medium may be used for storing data that is manipulated by the processor 2216 when executing software. The processing circuit 2202 further includes at least one of the modules 2204, 2206 and 2208. The modules 2204, 2206 and 2208 may be software modules running in the processor 2216, resident/stored in the processor-readable storage medium 2218, one or more hardware modules coupled to the processor 2216, or some combination thereof. The modules 2204, 2206 and 2208 may include microcontroller instructions, state machine configuration parameters, or some combination thereof.

In one configuration, the apparatus 2200 includes modules and/or circuits 2208 adapted to generate low-latency datagrams, including datagrams that do not include a slave address field and/or a command field. The apparatus 2200 may include modules and/or circuits 2206 adapted to generate trigger activation information that causes one or more slave devices to trigger a configuration change in a bus arbitration or sequence of bus arbitrations. The apparatus 2200 may include modules and/or circuits 2204 adapted to configure, conduct and/or participate in a transaction over the serial bus that includes transmitting the low-latency datagrams.

In one example, the apparatus 2200 includes physical layer circuits and/or modules 2214 that implement an interface circuit adapted to couple the apparatus 2200 to a serial bus 2212, including a first serial bus. The apparatus 2200 may have a processor 2216 configured to receive configuration information transmitted over a serial bus, receive one or more clock pulses on a clock line of the serial bus, and use the configuration information to reconfigure at least one device and in accordance with timing indicated by at least one edge of the one or more clock pulses.

The processor 2216 may be further configured to store the configuration information in a first holding register associated with a first trigger, actuate the first trigger after detecting a first edge in the one or more clock pulses, and transfer one or more bits of the first holding register to a register that controls one or more elements of the at least one device when the first trigger is actuated. The processor 2216 may be further configured to receive trigger activation information in a datagram that includes at least a portion of the configuration information, and activate the first trigger when indicated by the trigger activation information. The first trigger may be actuated when a data line of the serial bus is in a first signaling state when the first edge is detected. A second trigger may be suppressed when the data line is in a second signaling state when the first edge is detected.

The processor 2216 may be further configured to receive a trigger identifier in the datagram, after the trigger activation information. The trigger identifier may indicate the first trigger. The processor 2216 may be further configured to receive trigger activation information in a datagram that includes at least a portion of the configuration information, and actuate the first trigger as a bit of the configuration information is received when the bit activates the first trigger.

In one example, the processor 2216 may be further configured to receive trigger activation information in a datagram that includes at least a portion of the configuration information. The one or more clock pulses may be received after the trigger activation information. Receiving one or more clock pulses may include receiving a sequence start condition, and receiving the one or more clock pulses upon completion of the sequence start condition. The first trigger may be actuated when a data line of the serial bus is in a first signaling state when the first edge is detected. The second trigger may be suppressed when the data line is in a second signaling state when the first edge is detected.

The processor 2216 may be further configured to actuate a second trigger after detecting a second edge in the one or more clock pulses, and transferring one or more bits of a second holding register to a second register that controls an element of the at least one device when the second trigger is actuated. A time elapsed between the first edge and the second edge may include a stretched clock period. The first edge may correspond to a signaling transition in a first direction, and the second edge corresponds to a signaling transition in a second direction that is different from the first direction.

The processor-readable storage medium 2218 may include transitory or non-transitory storage devices configured to store code, instructions and/or parameters used to implement one or more methods or procedures disclosed herein. The processor-readable storage medium 2218 may include code for receiving configuration information transmitted over a serial bus, receiving one or more clock pulses on a clock line of the serial bus, and using the configuration information to reconfigure at least one device and in accordance with timing indicated by at least one edge of the one or more clock pulses.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications, comprising:
receiving configuration information transmitted over a serial bus;
receiving one or more clock pulses on a clock line of the serial bus;
using the configuration information to reconfigure at least one device in accordance with timing indicated by at least one edge of the one or more clock pulses;
storing the configuration information in a first holding register associated with a first trigger;
actuating the first trigger after detecting a first edge in the one or more clock pulses;
transferring one or more bits of the first holding register to a register that controls one or more elements of the at least one device when the first trigger is actuated; and
receiving trigger activation information in a datagram that includes at least a portion of the configuration information, wherein the one or more clock pulses are received after the trigger activation information.

2. The method of claim 1, further comprising:
actuating the first trigger when indicated by the trigger activation information.

3. The method of claim 2, wherein the first trigger is actuated when a data line of the serial bus is in a first signaling state when the first edge is detected, and wherein a second trigger is suppressed when the data line is in a second signaling state when the first edge is detected.

4. The method of claim 2, further comprising:
receiving a trigger identifier in the datagram, after the trigger activation information, wherein the trigger identifier indicates the first trigger.

5. The method of claim 1, further comprising:
actuating the first trigger as a bit of the configuration information is received when the bit activates the first trigger.

6. The method of claim 1, wherein receiving the one or more clock pulses comprises:
receiving a sequence start condition; and
receiving the one or more clock pulses upon completion of the sequence start condition.

7. The method of claim 6, wherein the first trigger is actuated when a data line of the serial bus is in a first signaling state when the first edge is detected, and wherein a second trigger is suppressed when the data line is in a second signaling state when the first edge is detected.

8. The method of claim 1, further comprising:
actuating a second trigger after detecting a second edge in the one or more clock pulses; and
transferring one or more bits of a second holding register to a second register that controls one or more elements of the at least one device when the second trigger is actuated.

9. The method of claim 8, wherein a time elapsed between the first edge and the second edge includes a stretched clock period.

10. The method of claim 8, wherein the first edge corresponds to a signaling transition in a first direction, and the second edge corresponds to a signaling transition in a second direction that is different from the first direction.

11. An apparatus comprising:
an interface circuit adapted to couple the apparatus to a serial bus; and
a processor configured to:
receive configuration information transmitted over the serial bus;
receive one or more clock pulses on a clock line of the serial bus;
use the configuration information to reconfigure at least one device in accordance with timing indicated by at least one edge of the one or more clock pulses;
store the configuration information in a first holding register associated with a first trigger;
actuate the first trigger after detecting a first edge in the one or more clock pulses;
transfer one or more bits of the first holding register to a register that controls one or more elements of the at least one device when the first trigger is actuated; and
receive trigger activation information in a datagram that includes at least a portion of the configuration information, wherein the one or more clock pulses are received after the trigger activation information.

12. The apparatus of claim 11, wherein the processor is further configured to:
actuate the first trigger when indicated by the trigger activation information.

13. The apparatus of claim 12, wherein the first trigger is actuated when a data line of the serial bus is in a first signaling state when the first edge is detected, and wherein a second trigger is suppressed when the data line is in a second signaling state when the first edge is detected.

14. The apparatus of claim 12, wherein the processor is further configured to:
receive a trigger identifier in the datagram, after the trigger activation information, wherein the trigger identifier indicates the first trigger.

15. The apparatus of claim 11, wherein the processor is further configured to:
actuate the first trigger as a bit of the configuration information is received when the bit activates the first trigger.

16. The apparatus of claim 11, wherein the processor is further configured to:
receive a sequence start condition; and
receive the one or more clock pulses upon completion of the sequence start condition.

17. The apparatus of claim 16, wherein the first trigger is actuated when a data line of the serial bus is in a first signaling state when the first edge is detected, and wherein a second trigger is suppressed when the data line is in a second signaling state when the first edge is detected.

18. The apparatus of claim 11, wherein the processor is further configured to:
actuate a second trigger after detecting a second edge in the one or more clock pulses; and
transfer one or more bits of a second holding register to a second register that controls one or more elements of the at least one device when the second trigger is actuated.

19. The apparatus of claim 18, wherein a time elapsed between the first edge and the second edge includes a stretched clock period.

20. The apparatus of claim 18, wherein the first edge corresponds to a signaling transition in a first direction, and the second edge corresponds to a signaling transition in a second direction that is different from the first direction.

21. An apparatus comprising:
means for receiving configuration information transmitted over a serial bus;
means for receiving one or more clock pulses on a clock line of the serial bus;
means for using the configuration information to reconfigure at least one device in accordance with timing indicated by at least one edge of the one or more clock pulses;
means for storing the configuration information in a first holding register associated with a first trigger;
means for actuating the first trigger after detecting a first edge in the one or more clock pulses;
means for transferring one or more bits of the first holding register to a register that controls one or more elements of the at least one device when the first trigger is actuated; and
means for receiving trigger activation information in a datagram that includes at least a portion of the configuration information, wherein the one or more clock pulses are received after the trigger activation information.

* * * * *